US012644855B2

(12) United States Patent
Fuchiwaki et al.

(10) Patent No.: US 12,644,855 B2
(45) Date of Patent: Jun. 2, 2026

(54) ELECTROCHEMICAL ASSAY DEVICE

(71) Applicant: NATIONAL INSTITUTE OF ADVANCED INDUSTRIAL SCIENCE AND TECHNOLOGY, Tokyo (JP)

(72) Inventors: Yusuke Fuchiwaki, Takamatsu (JP); Shohei Yamamura, Takamatsu (JP); Eiichi Tamiya, Osaka (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 173 days.

(21) Appl. No.: 18/705,437

(22) PCT Filed: Oct. 18, 2022

(86) PCT No.: PCT/JP2022/038699
§ 371 (c)(1),
(2) Date: Apr. 26, 2024

(87) PCT Pub. No.: WO2023/085006
PCT Pub. Date: May 19, 2023

(65) Prior Publication Data
US 2025/0224359 A1    Jul. 10, 2025

(30) Foreign Application Priority Data
Nov. 15, 2021    (JP) ................................. 2021-185655

(51) Int. Cl.
| | |
|---|---|
| *G01N 27/30* | (2006.01) |
| *B01L 3/00* | (2006.01) |
| *G01N 27/327* | (2006.01) |

(52) U.S. Cl.
CPC ............ *G01N 27/30* (2013.01); *B01L 3/5023* (2013.01); *G01N 27/3272* (2013.01);
(Continued)

(58) Field of Classification Search
CPC ....... G01N 27/30; G01N 27/327–3272; G01N 27/3275–3278; G01N 27/403;
(Continued)

(56) References Cited

U.S. PATENT DOCUMENTS

| | | | | |
|---|---|---|---|---|
| 2005/0247573 A1* | 11/2005 | Nakamura | ......... | G01N 27/3272 |
| | | | | 204/403.01 |
| 2008/0032420 A1* | 2/2008 | Lambert | .......... | G01N 33/54388 |
| | | | | 436/514 |

(Continued)

FOREIGN PATENT DOCUMENTS

| | | |
|---|---|---|
| JP | 2009204339 A | 9/2009 |
| JP | 2011220808 A | 11/2011 |

(Continued)

OTHER PUBLICATIONS

Perju et al., "Integrating high-performing electrochemical transducers in lateral flow assay," Analytical and Bioanalytical Chemistry ( 2021) 413:5535-5549 Published online: Apr. 28, 2021 (Year: 2021).*

(Continued)

*Primary Examiner* — Alexander S Noguerola
(74) *Attorney, Agent, or Firm* — Myers Bigel, P.A.

(57) ABSTRACT

An electrochemical assay device includes an inner flow passage through which a liquid injected from an inlet flows and a first liquid absorbing material that absorbs the liquid that has passed through the inner flow passage, and is configured to be able to perform an assay based on an electrochemical method. The inner flow passage includes a microflow passage that communicates with the inlet and a separating flow passage provided between the microflow (Continued)

(ONE END) ←——— L ———→ (THE OTHER END)

passage and the first liquid absorbing material for separating the liquid inside the inner flow passage into a part to be left in the microflow passage and a part to be absorbed by the first liquid absorbing material when the injection of the liquid is stopped. The electrochemical assay device includes an electrode portion that is disposed inside the microflow passage, a connecting portion that is connected to an external measurement device, and a conducting wire portion that electrically connects the electrode portion to the connecting portion.

15 Claims, 19 Drawing Sheets

(52) U.S. Cl.
CPC .................. *B01L 2300/0816* (2013.01); *B01L 2300/0887* (2013.01); *G01N 27/3276* (2013.01)

(58) Field of Classification Search
CPC .......... B01L 3/5023; B01L 2300/0816; B01L 2300/0887
See application file for complete search history.

(56) References Cited

U.S. PATENT DOCUMENTS

| | | | | |
|---|---|---|---|---|
| 2021/0170398 | A1* | 6/2021 | Fuchiwaki | ............ B01L 3/5023 |
| 2023/0030862 | A1 | 2/2023 | Tamiya et al. | |

FOREIGN PATENT DOCUMENTS

| | | | | |
|---|---|---|---|---|
| JP | | 2012112724 | A | 6/2012 |
| JP | | 2019113460 | A | 7/2019 |
| JP | | 2019144133 | A | 8/2019 |
| JP | | 2021143909 | A | 9/2021 |
| WO | WO 2020/045551 | A1 * | 5/2020 | ............ G01N 37/00 |
| WO | | 2021125173 | A1 | 6/2021 |

OTHER PUBLICATIONS

"English language translation of International Search Report", International Application No. PCT/JP2022/038699, Dec. 27, 2022, 3 pp.
"Notice of Reasons for Refusal" with English language translation, JP Patent Application No. 2023-559504, Mar. 7, 2025, 12 pp.

* cited by examiner (ONE END) ←——— L ———→ (THE OTHER END)

(ONE END)   ⟵   L   ⟶   (THE OTHER END)

SECTIONAL VIEW ALONG A-A

SECTIONAL VIEW ALONG B-B

(ONE END) ◄————— L —————► (THE OTHER END)

ELECTROCHEMICAL ASSAY DEVICE

RELATED APPLICATIONS

This application is a 35 U.S.C. § 371 national stage application of PCT Application No. PCT/JP2022/038699, filed on Oct. 18, 2022, which claims priority from Japanese Patent Application No. 2021-185655, filed on Nov. 15, 2021, the contents of which are incorporated herein by reference in their entireties. The above-referenced PCT International Application was published in the Japanese language as International Publication No. WO 2023/085006 A1 on May 19, 2023.

TECHNICAL FIELD

The present invention relates to an assay device and particularly to an electrochemical assay device capable of using a small amount of liquid and performing an assay based on an electrochemical method.

BACKGROUND ART

Patent Document 1 describes an example of a conventional assay device that performs an assay using a small amount of liquid. The assay device described in Patent Document 1 includes a microflow passage configured to allow fluid to flow, an absorbing porous medium disposed at a distance from one end of the microflow passage, the one end being positioned at one end in a flow direction of the fluid, a separating space disposed between the one end of the microflow passage and the absorbing porous medium, and two sideways ventilation passages being adjacent to both sides of the microflow passage, respectively in a width direction orthogonal to the flow direction, the two sideways ventilation passages being communicated with the microflow passage to allow air circulation.

CITATION LIST

Patent Literature

Patent Document 1: International Publication No. WO 2020/045551 A1

SUMMARY OF INVENTION

Problem to be Solved by the Invention

The assay device described in Patent Document 1 is adapted to detect optical signals (color development, chemiluminescence, and the like) on the basis of enzyme reactions inside the microflow passage and is not configured to be able to perform an assay based on the electrochemical method.

Typically, sensors and the like using the electrochemical method can quickly perform measurement, are relatively unlikely to be affected by noise, can realize size reduction of analyzer devices and the like, and are thus suitable for measurement works on sites. Many sensor devices based on bioelectronics technologies, such as semiconductor biosensors including small-sized glucometer sensors for collecting blood from fingertips and measuring blood glucose levels like self-monitoring of blood glucose (SMBG), have been put into practical use using the electrochemical method. Therefore, it has been desired to make it possible to use the electrochemical method in assay devices as well.

Thus, an object of the present invention is to provide an electrochemical assay device capable of using a small amount of liquid and performing an assay based on the electrochemical method.

Means for Solving the Problems

According to an aspect of the present invention, an electrochemical assay device includes: an inner flow passage through which a liquid injected from an inlet flows; and a liquid absorbing material that absorbs the liquid that has passed through the inner flow passage, and is configured to be able to perform an assay based on an electrochemical method. The inner flow passage includes a microflow passage that communicates with the inlet and a separating flow passage that is provided between the microflow passage and the liquid absorbing material for separating the liquid inside the inner flow passage into a part to be left in the microflow passage and a part to be absorbed by the liquid absorbing material when the injection of the liquid is stopped. Also, the electrochemical assay device includes an electrode portion disposed inside the microflow passage, a connecting portion connected to an external measurement device, and a conducting wire portion electrically connecting the electrode portion to the connecting portion.

According to another aspect, an electrochemical assay device includes: an inner flow passage through which a liquid injected from an inlet flows; and a liquid absorbing material that absorbs the liquid that has passed through the inner flow passage, and is configured to be able to perform an assay based on an electrochemical method. The inner flow passage includes a microflow passage that communicates with the inlet and a separating flow passage that is provided between the microflow passage and the liquid absorbing material for separating the liquid inside the inner flow passage into a part to be left in the microflow passage and a part to be absorbed by the liquid absorbing material when the injection of the liquid is stopped. Also, the electrochemical assay device includes a plurality of electrode portions disposed inside the microflow passage and separated from each other in a flow direction of the liquid, a plurality of connecting portions each provided to be separated from any of the plurality of electrode portions in a width direction perpendicularly intersecting the flow direction of the liquid and connected to an external measurement device, and a plurality of conducting wire portions electrically connecting the corresponding electrode portions to the connecting portions, respectively.

Advantageous Effects of Invention

According to the present invention, it is possible to provide an electrochemical assay device capable of using a small amount of liquid and performing an assay based on the electrochemical method.

BRIEF DESCRIPTION OF DRAWINGS

FIG. 3 is a diagram illustrating an upper flow passage forming member, where

FIG. 4 is a diagram illustrating a lower flow passage forming member, where

FIG. 5 is a diagram illustrating an intermediate member, where

FIG. 6 is a diagram illustrating a structure (including a liquid absorbing material) in which the upper flow passage forming member, the lower flow passage forming member, and the intermediate member are stacked and integrated, where

FIG. 8 is a diagram for explaining motions of a first liquid injected to the electrochemical assay device, and is a diagram schematically illustrating an inner flow passage and the like when the electrochemical assay device is seen from above.

FIG. 9 is a diagram for explaining motions of the first liquid and a second liquid when the second liquid is injected to the electrochemical assay device after the injection of the first liquid thereinto is stopped, and is a diagram schematically illustrating the inner flow passage and the like when the electrochemical assay device is seen from above.

FIG. 17 is a diagram illustrating a lower flow passage forming member of the electrochemical assay device according to the third embodiment, where

MODE FOR CARRYING OUT THE INVENTION

Figure 1:
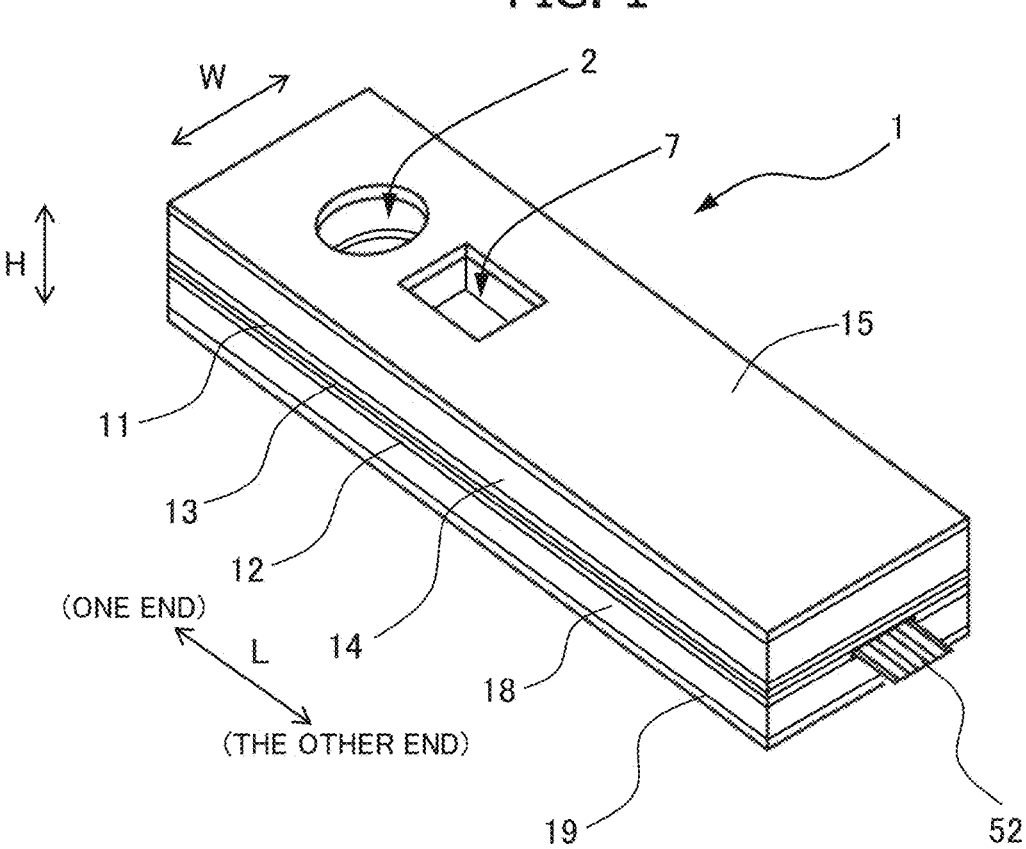
FIG. 1 is a perspective view of an electrochemical assay device according to a first embodiment.

Hereinafter, an electrochemical assay device according to an embodiment of the present invention will be described.

The electrochemical assay device according to the embodiment is configured to be able to use a small amount of liquid and perform an assay based on the electrochemical method. The electrochemical assay device may be able to perform an assay by a method other than the electrochemical method. A liquid used by the electrochemical assay device may be any liquid as long as the liquid can flow through a flow passage (inner flow passage) inside the device and is not particularly limited. Such a liquid is typically an aqueous solution.

The liquid used by the electrochemical assay device may be, for example, a food, a suspension liquid of a food, an extract liquid of a food, a drink water, a river water, a soil suspension, an industrial wastewater, or a liquid containing components collected from a living body. Although the liquid containing components collected from a living body may be a liquid derived from a living body such as whole blood, serum, blood plasma, urine, a diluted feces solution, saliva, or a cerebral spinal fluid, for example, the liquid is not limited thereto.

In a case where a food, a suspension liquid of a food, an extract liquid of a food, a drink water, a river water, a soil suspension, or an industrial wastewater is used, for example, the electrochemical assay device may measure pathogens in the food or the drink water or may measure contamination substances in the river water, in the soil, or in the wastewater. In a case where a liquid derived from a living body is used, for example, the electrochemical assay device may measure a specimen that is effective for diagnosis in the liquid for applications of a pregnancy test, urinalysis, a stool test, a test for adult diseases, an allergy test, a test for infectious diseases, a drug test, a cancer test, and the like.

In the specification, the "specimen" means a compound or a composition detected or measured mainly using the liquid. Although the "specimen" includes saccharides (glucose, for example), cells, protein or peptide (serum protein, hormone, enzyme, an immune regulator immunomodulatory factor, lymphokine, monokine, cytokine, glycoprotein, a vaccine antigen, an antibody, a growth factor, a proliferative factor, for example), fat, an amino acid, a nucleic acid, steroid, a vitamin, a pathogen or an antigen thereof, a natural substance or a synthetic chemical substance, a contamination substance, a drug for treatment or an illegal drug, or a metabolite or an antibody of such substances, the "specimen" is not limited thereto.

In the specification, the "microflow passage" means a flow passage inside the assay device that enables the specimen to be detected or measured using a small amount of liquid in a microliter ($\mu l$) order, that is, a liquid in a small amount that is equal to or greater than 1 $\mu l$ and less than 1000 $\mu l$.

In the specification, an "assay reagent" means any substance that leads to a detectable result by causing a reaction with the liquid or the specimen contained therein, for example. The detectable result is an electrochemical signal, light emission, fluorescence, or the like. Here, the assay reagent in a case where an assay based on an electrochemiluminescence method preferably contains an electrochemiluminescence label and a reducing agent. Although the electrochemiluminescence label is a luminol, a ruthenium (Ru) metal complex, gold nanoparticles, an adamantly dioxetane derivative, an acridinium ester, or the like, the electrochemiluminescence label is not limited thereto.

In the specification, a "porous element" means a member that have a plurality of (a large number of) fine pores and can absorb a liquid and may include paper, a cellulose film, a non-woven cloth, plastic, or the like. Here, the "porous element" preferably has hydrophilicity in a case where the liquid is hydrophilic, and the "porous element" preferably has hydrophobicity in a case where the liquid is hydrophobic, although not limited thereto. Preferably, the "porous element" has hydrophilicity and is paper. Furthermore, the "porous element" can be one of cellulose, nitrocellulose, cellulose acetate, filter paper, tissue paper, toilet paper, a paper towel, a cloth, and a hydrophilic porous polymer that allows water to penetrate therethrough.

Note that the electrochemical assay device will be simply referred to as an "assay device" in the following description.

First Embodiment

First, a basic configuration of an assay device according to the first embodiment will be described with reference to FIGS. 1 and 2. FIG. 1 is a perspective view of an assay device 1 according to the first embodiment, and FIG. 2 is a schematic sectional view of the assay device 1 according to the first embodiment.

As illustrated in FIG. 1, the assay device 1 is formed into a substantially rectangular parallelepiped shape as a whole and includes, in an upper surface, an inlet 2 into which a liquid is injected (injected mainly in a dropwise manner). The inlet 2 is formed into a circular shape in a top view and is opened in an upper surface of the assay device 1 on one end in a longitudinal direction L and at a substantially center portion in a lateral direction (hereinafter, referred to as a "width direction") W perpendicularly intersecting the longitudinal direction L.

Figure 2:
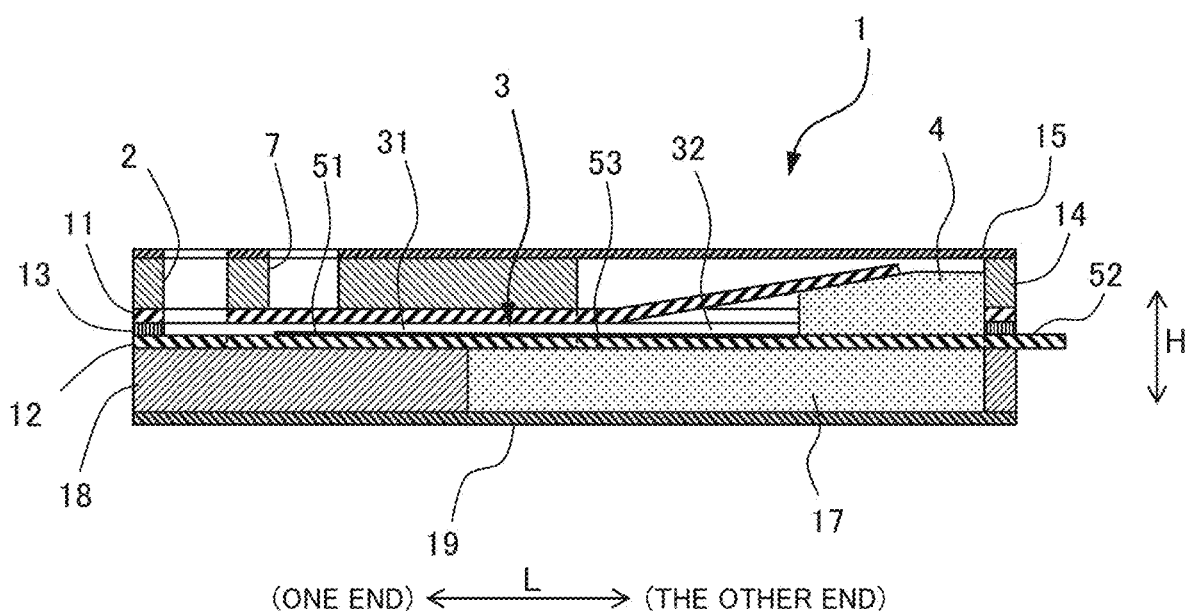
FIG. 2 is a schematic sectional view of the electrochemical assay device according to the first embodiment.

As illustrated in FIG. 2, the assay device 1 includes an inner flow passage 3 through which a liquid injected from the inlet 2 flows and a first liquid absorbing material 4 that absorbs the liquid that has passed through the inner flow passage 3. The inner flow passage 3 extends from the one end (the left side in FIG. 2) toward the other end (the right side in FIG. 2) in the longitudinal direction L inside the assay device 1. The first liquid absorbing material 4 is formed into a block shape using a flexible porous material capable of absorbing a liquid and is disposed on the other end in the longitudinal direction L inside the assay device 1. In other words, the longitudinal direction L is also a flow direction of the liquid inside the assay device 1, the one end in the longitudinal direction L where the inlet 2 is included can be referred to as an upstream side in the flow direction of the liquid, and the other end in the longitudinal direction L where the first liquid absorbing material 4 is included can be referred to as a downstream side in the flow direction of the liquid in the embodiment.

In the embodiment, the inner flow passage 3 includes an upper wall and a lower wall as is obvious from FIG. 2 as well. Furthermore, the inner flow passage 3 is defined by the upper wall and the lower wall and does not have side walls in the embodiment. Also, the inner flow passage 3 includes a microflow passage 31 and a separating flow passage 32.

The microflow passage 31 constitutes a flow passage of the inner flow passage 3 close to the inlet 2, that is, an upstream-side flow passage of the inner flow passage 3. The microflow passage 31 is formed as a flow passage that communicates with the inlet 2 and extends horizontally (this is not necessarily horizontal in a strict sense and may be substantially horizontal; the same applies to the following description) from a vicinity of the inlet 2, preferably right below the inlet 2 to a substantially center portion of the assay device 1 in the longitudinal direction L.

The separating flow passage 32 constitutes a flow passage of the inner flow passage 3 close to the first liquid absorbing material 4, that is, a downstream flow passage of the inner flow passage 3. The separating flow passage 32 is formed as a flow passage reaching the first liquid absorbing material 4 from (a downstream end of) the microflow passage 31.

In other words, the first liquid absorbing material 4 is provided to be separated from the microflow passage 31 (downstream end) in the longitudinal direction L, and the separating flow passage 32 is provided between the microflow passage 31 and the first liquid absorbing material 4 in the embodiment.

The separating flow passage 32 is a flow passage for separating the liquid inside the inner flow passage 3 when injection of the liquid into the inlet 2 is stopped. Specifically, the liquid inside the inner flow passage 3 is divided by the separating flow passage 32 such that the liquid inside the inner flow passage 3 is separated into a part to be left in the microflow passage 31 and a part to be absorbed by the first liquid absorbing material 4 when the injection of the liquid into the inlet 2 is stopped as will be described later.

Although not illustrated in FIGS. 1 and 2, a pair of first sideways spaces 5 and 5 are provided on both sides of the microflow passage 31 to be adjacent to the microflow passage 31, and a pair of second sideways spaces 6 and 6 are provided on both sides of the separating flow passage 32 in the width direction W to be adjacent to the separating flow passage 32 in the assay device 1 as will be described later (see FIG. 6(a)). As described above, the inner flow passage 3 does not include side walls in the embodiment. Therefore, the microflow passage 31 communicates with the pair of first sideways spaces 5 and 5, and the separating flow passage 32 communicates with the pair of second sideways spaces 6 and 6.

In the embodiment, the upper wall and the lower wall of the microflow passage 31 extend horizontally. Also, a flow passage height of the microflow passage 31, that is, a distance between the upper wall and the lower wall of the microflow passage 31 in a height direction H is constant (this is not necessarily constant in a strict sense and may be substantially constant; the same applies to the following description). Additionally, the flow passage height of the microflow passage 31 is set such that an interfacial tension of the liquid that may prevent leakage of the liquid to the pair of first sideways spaces 5 and 5 may be generated when the liquid flows through the microflow passage 31.

Although not particularly limited, the flow passage height (the dimension in the height direction H) of the microflow passage 31 may be set within a range of 1 μm to 1 mm, for example. Also, a width (a dimension in the width direction W) of the microflow passage 31 may be set within a range of 100 μm to 1 cm, for example, and a length (a dimension in the longitudinal direction L) of the microflow passage 31 may be set within a range of 10 μm to 10 cm, for example.

A lower wall of the separating flow passage 32 is configured with a part extended directly from the lower wall of the microflow passage 31 and extends horizontally. On the other hand, an upper wall of the separating flow passage 32 is inclined upward such that the height position thereof is located at a higher position as it goes away from (the downstream end of) the microflow passage 31, in other words, as it approaches the first liquid absorbing material 4.

Here, in a case where the liquid is a specimen liquid in a biochemical test, blocking treatment, plasma treatment, or the like is preferably performed on the surface of the inner flow passage 3 (the microflow passage 31 and the separating flow passage 32) with which the liquid will come into contact in order to prevent living body-derived substances, antigens, antibodies, and the like from adsorbing in a non-specific manner. Examples of a blocking agent used in the blocking treatment include commercially available blocking agents, bovine serum albumin, casein, skim milk, gelatin, a surfactant, polyvinyl alcohol, globulin, serum (such as fetal bovine serum and normal rabbit serum), ethanol, an MPC polymer, and the like. Although the commercially available blocking agents include ImmunoBlock, Block Ace, Pierce Blocking Buffer, StartingBlock, Stabil-Guard, StabilBrock, StabilCoat, ChonBlock, and the like, the commercially available blocking agents are not limited thereto.

Furthermore, the assay device 1 includes an observation window 7 for observing the inside of the microflow passage 31 in the embodiment. The observation window 7 is formed into a rectangular shape in a top view and is opened in the upper surface of the assay device 1. More specifically, the observation window 7 is opened at a part above an electrode portion 51 (which will be described later) disposed inside the microflow passage 31 in the upper surface of the assay device 1.

The inner flow passage 3 will be described in further detail.

In the embodiment, the inner flow passage 3 is formed by an upper flow passage forming member 11, a lower flow passage forming member 12, and an intermediate member 13 that functions as a spacer therebetween being stacked. Hereinafter, the upper flow passage forming member 11, the lower flow passage forming member 12, and the intermediate member 13 will be described in order.

Figure 3A:
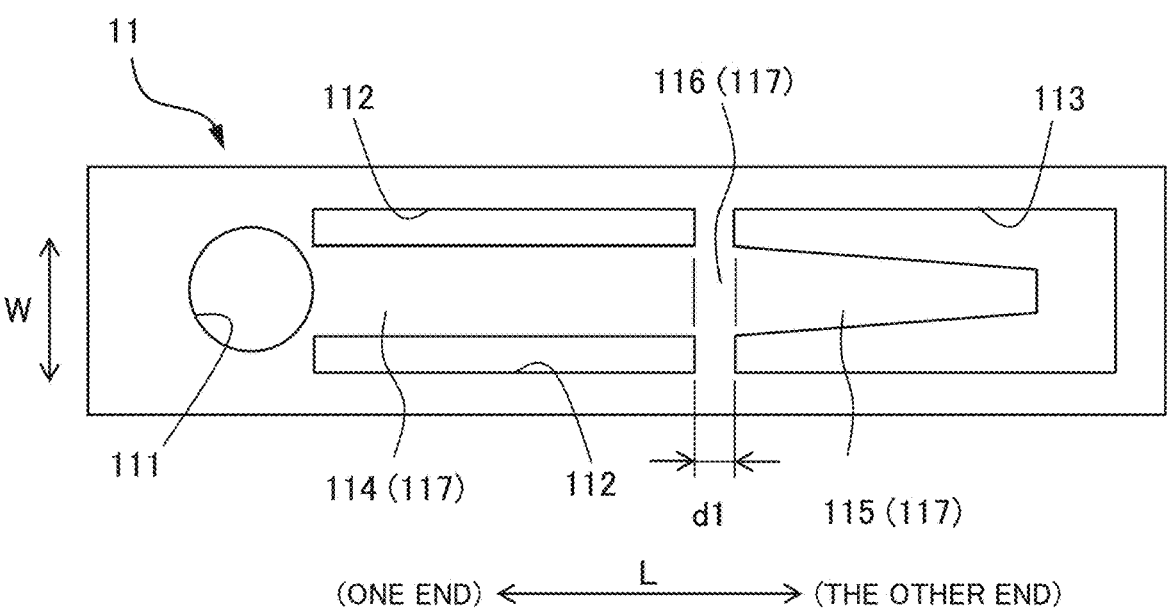
FIG. 3A is a top view of the upper flow passage forming member.
Figure 3B:
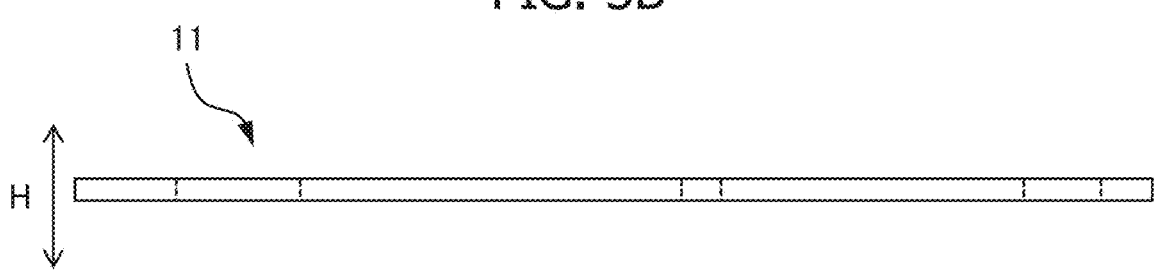
FIG. 3B is a side view of the upper flow passage forming member.
Figure 3C:
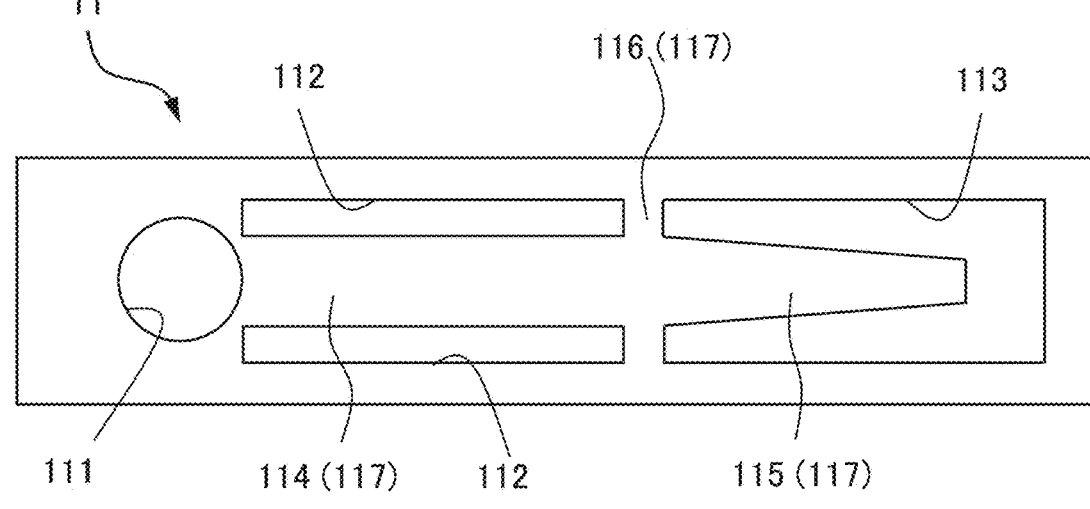
FIG. 3C is a bottom view of the upper flow passage forming member.

FIG. 3 illustrates the upper flow passage forming member 11. FIG. 3A is a top view of the upper flow passage forming member 11, FIG. 3B is a side view of the upper flow passage forming member 11, and FIG. 3C is a bottom view of the upper flow passage forming member 11.

In the present embodiment, the upper flow passage forming member 11 is formed to have flexibility from a transparent synthetic resin. Preferably, the upper flow passage forming member 11 is configured from a molded article of a transparent synthetic resin. Although examples of such a synthetic resin include polystyrene (PS), acryl (PMMA), polycarbonate (PC), a cycloolefin polymer (COP), a cycloolefin copolymer (COC), acrylonitrile butadiene styrene (ABS), acrylonitrile styrene (AS), a silicone resin, and the like, the synthetic resin is not limited thereto. Also, a contact angle of the surface of the upper flow passage forming member 11 is preferably equal to or less than 90 degrees with respect to water.

Referring to FIGS. 3A to 3C, the upper flow passage forming member 11 is formed as a flat plate-shaped member with a rectangular outer shape in a top view. A first circular hole 111 with a circular shape in a top view, a pair of first slit holes 112 and 112 with rectangular shapes in a top view, and a first U-shaped hole 113 with a laterally-facing substantially U-shape in a top view are formed in the upper flow passage forming member 11. The first circular hole 111, the pair of first slit holes 112 and 112, and the first U-shaped hole 113 penetrate through the upper flow passage forming member 11 in the height direction H.

The first circular hole 111 is formed on the one end of the upper flow passage forming member 11 in the longitudinal direction L and at a substantially center portion of the upper flow passage forming member 11 in the width direction W. The first circular hole 111 constitutes a part of the inlet 2.

The pair of first slit holes 112 and 112 are separated from each other in the width direction W. Each of the pair of first slit holes 112 and 112 extends from a vicinity of the first circular hole 111 toward the other end in the longitudinal direction L up to a substantially center portion of the upper flow passage forming member 11 in the longitudinal direction L.

An opened part of the U shape of the first U-shaped hole 113 faces the one end of the upper flow passage forming member 11 in the longitudinal direction L. The first U-shaped hole 113 is formed to be closer to the other end of the upper flow passage forming member 11 in the longitudinal direction L than the pair of first slit holes 112 and 112.

Also, an upper wall portion 117 constituting an upper wall of the inner flow passage 3 is formed by a first inter-slit part 114 sandwiched by the pair of first slit holes 112 and 112, an inner part 115 inside the first U-shaped hole 113, and a first connecting part 116 establishing connection between the first inter-slit part 114 and the inner part 115 in the embodiment. In other words, the upper flow passage forming member 11 includes the upper wall portion 117 constituting the upper wall of the inner flow passage 3. Also, the first inter-slit part 114 and the first connecting part 116 constitute an upper wall of the microflow passage 31, and the inner part 115 constitutes an upper wall of the separating flow passage 32.

Here, although the width of the first inter-slit part 114 is constant, the width of the inner part 115 gradually decreases as it goes further away from the first connecting part 116 in the embodiment. Also, a distance d1 between the pair of first slit holes 112 and 112 and the first U-shaped hole 113 in the longitudinal direction L is smaller than the width of the first inter-slit part 114, and specifically, the distance d1 is set to be equal to or less than ⅔ the width of the first inter-slit part 114, preferably equal to or less than ½ the width of the first inter-slit part 114.

Figure 4A:
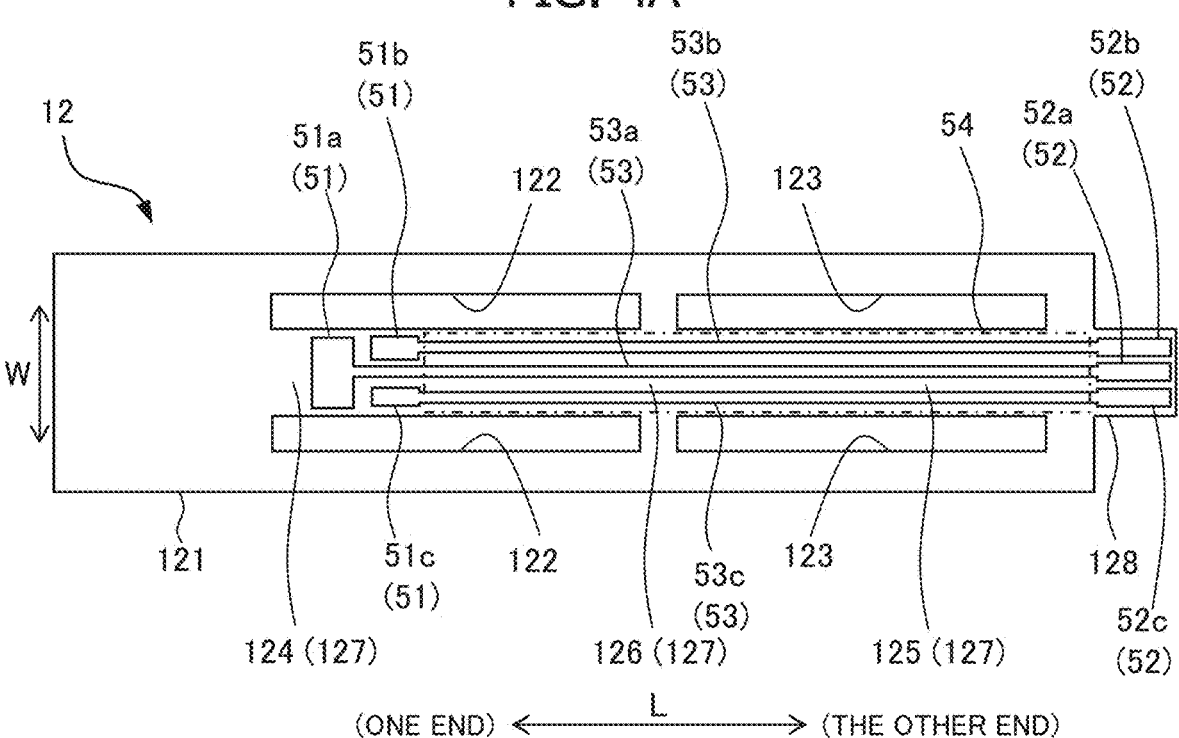
FIG. 4A is a top view of the lower flow passage forming member.
Figure 4B:
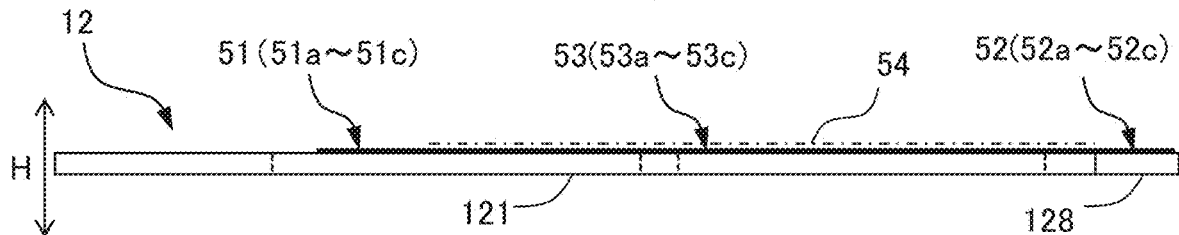
FIG. 4B is a side view of the lower flow passage forming member.
Figure 4C:
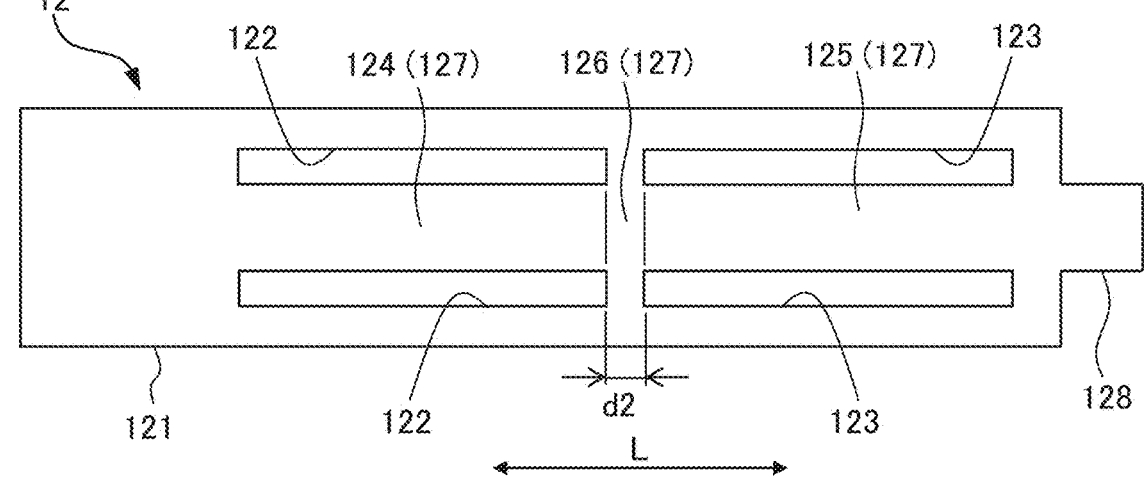
FIG. 4C is a bottom view of the lower flow passage forming member.

FIG. 4 illustrates the lower flow passage forming member 12. FIG. 4A is a top view of the lower flow passage forming member 12, FIG. 4B is a side view of the lower flow passage forming member 12, and FIG. 4C is a bottom view of the lower flow passage forming member 12.

In the embodiment, the lower flow passage forming member 12 is formed to have flexibility from a synthetic resin. The lower flow passage forming member 12 is preferably configured with a molded article of a synthetic resin colored to a white color, a black color, or the like. Although not particularly limited, the lower flow passage forming member 12 may be formed of, for example, a polyether ketone resin (PEEK) material, polyethylene (PE), polyethylene terephthalate (PET), acryl (PMMA), polystyrene (PS), polypropylene (PP), polycarbonate (PC), acrylonitrile butadiene styrene (ABS), polyvinyl chloride (PVC), a cycloolefin copolymer (COC), or a cycloolefin polymer (COP). Also, the contact angle of the surface of the lower flow passage forming member 12 is preferably equal to or less than 90 degrees with respect to water.

Referring to FIGS. 4A to 4C, the lower flow passage forming member 12 includes a flat plate-shaped main body portion 121 with an outer shape that is substantially the same as the outer shape of the upper flow passage forming member 11 in a top view. A pair of second slit holes 122 and 122 with rectangular shapes in a top view and a pair of third slit holes 123 and 123 with rectangular shapes in a top view are formed in the main body portion 121 of the lower flow passage forming member 12. The pair of second slit holes 122 and 122 and the pair of third slit holes 123 and 123 penetrate through the lower flow passage forming member 12 in the height direction H.

The pair of second slit holes 122 and 122 are formed to correspond to the pair of first slit holes 112 and 112 of the upper flow passage forming member 11. In other words, the pair of second slit holes 122 and 122 are formed to be located below the pair of first slit holes 112 and 112 of the upper flow passage forming member 11 when the upper flow passage forming member 11, the lower flow passage forming member 12, and the intermediate member 13 are stacked.

The pair of third slit holes 123 and 123 are formed to correspond to a pair of linear portions of the first U-shaped hole 113 of the upper flow passage forming member 11. In other words, the pair of third slit holes 123 and 123 are formed to be located below the pair of linear portions of the first U-shaped hole 113 of the upper flow passage forming member 11 when the upper flow passage forming member 11, the lower flow passage forming member 12, and the intermediate member 13 are stacked.

Also, a lower wall portion 127 constituting a lower wall of the inner flow passage 3 is formed by a second inter-slit part 124 sandwiched between the pair of second slit holes 122 and 122, a third inter-slit part 125 sandwiched between the pair of third slit holes 123 and 123, and a second connecting part 126 establishing connection between the second inter-slit part 124 and the third inter-slit part 125 in the embodiment. In other words, the lower flow passage forming member 12 includes the lower wall portion 127 constituting the lower wall of the inner flow passage 3. Moreover, the second inter-slit part 124 and the second connecting part 126 constitute the lower wall of the microflow passage 31, and the third inter-slit part 125 constitutes the lower wall of the separating flow passage 32.

Here, widths of the second inter-slit part 124 and the third inter-slit part 125 are the same as a width of the first inter-slit part 114 of the upper flow passage forming member 11, and a distance d2 between the pair of second slit holes 122 and 122 and the pair of third slit holes 123 and 123 in the longitudinal direction L is the same as the distance d1 between the pair of first slit holes 112 and 112 and the first U-shaped hole 113 in the longitudinal direction L of the upper flow passage forming member 11 in the embodiment.

Also, the lower flow passage forming member 12 includes a projecting portion 128 that projects outward from an end portion of the main body portion 121 on the other end in the longitudinal direction L. The projecting portion 128 is formed into a rectangular shape in a top view. In the embodiment, the projecting portion 128 has a width that is substantially the same as the width of the third inter-slit part 125 and is located on an extension of the third inter-slit part 125 on the other end in the longitudinal direction L.

Furthermore, an electrode portion 51, a connecting portion 52, and a conducting wire portion 53 are formed in the lower flow passage forming member 12. Specifically, the electrode portion 51, the connecting portion 52, and the conducting wire portion 53 are formed integrally with the lower flow passage forming member 12 by a conductive material being printed on the upper surface of the lower flow passage forming member 12 in the embodiment. Although examples of the conductive material include conductive carbon, gold, silver, silver chloride, platinum, nickel, graphite, palladium, iron, copper, zinc, a carbon paste, a mesh electrode, diamond, an indium-tin oxide (ITO) electrode, and the like, the conductive material is not limited thereto. Also, the electrode portion, the connecting portion, and the conducting wire portion are preferably printed using the same material, the electrode portion, the connecting portion, and the conducting wire portion may be printed using materials that are different from each other.

The electrode portion 51 is formed (printed) on the upper surface of the second inter-slit part 124 constituting the lower wall of the microflow passage 31. The electrode portion 51 includes a working electrode 51a, an opposite electrode 51b, and a reference electrode 51c.

The connecting portion 52 is formed (printed) on the upper surface of the projecting portion 128. The connecting portion 52 includes a first terminal portion 52a corresponding to the working electrode 51a, a second terminal portion 52b corresponding to the opposite electrode 51b, and a third terminal portion 52c corresponding to the reference electrode 51c. An external measurement device, specifically, an electrochemical analyzer capable of performing electrochemical measurement, an electrochemiluminescence analyzer capable of performing electrochemiluminescence measurement, or the like are mainly connected to the connecting portion 52. Note that although examples of the electrochemical measurement described here include cyclic voltammetry, linear sweep voltammetry, step voltammetry, Tafel plot, chronoamperometry, chronocoulometry, differential pulse voltammetry, normal pulse voltammetry, square wave voltammetry, AC voltammetry, amperometry, second harmonic voltammetry, Fourier transform AC voltammetry, differential pulse amperometry, double-differential pulse amperometry, triple-pulse amperometry, integral pulse amperometric detection, bulk electrolysis/coulometry, hydrodynamic modulation voltammetry, AC impedance, impedance/time, impedance/potential, chronopotentiometry, chronopotentiometry/time potentiometric stripping analysis, electrochemical noise measurement, open circuit potential-time, a sweep step function, a multi-potential step, a multi-current step, and the like, the electrochemical measurement is not limited thereto. Also, although the electrochemiluminescence measurement described here means a measurement method of measuring a signal that electrochemically emits light on the basis of the aforementioned electrochemical measurement method, and examples of a device that measures the electrochemiluminescence include a cooling CCD, a photomultiplier tube, and the like, the electrochemiluminescence measurement and the device are not limited thereto.

The conducting wire portion 53 electrically connects the electrode portion 51 to the connecting portion 52. The conducting wire portion 53 is formed (printed) on an upper surface of the part of the lower flow passage forming member 12 between the electrode portion 51 and the connecting portion 52 to connect the electrode portion 51 to the connecting portion 52. In the embodiment, the conducting wire portion 53 is formed to extend from the electrode portion 51 over the upper surface of the second inter-slit part 124, over the upper surface of the second connecting part 126, and over the upper surface of the third inter-slit part 125 and reach the connecting portion 52. The conducting wire portion 53 includes a first conducting wire portion 53a that connects the working electrode 51a to the first terminal portion 52a, a second conducting wire portion 53b that connects the opposite electrode 51b to the second terminal portion 52b, and a third conducting wire portion 53c that connects the reference electrode 51c to the third terminal portion 52c. Here, a most part of the conducting wire portion 53 (the first to third conducting wire portions 53a to 53c) is covered with an electrical insulating material 54 as illustrated by one-dotted dashed lines in FIGS. 4A and 4B. Although polyimide may be used as a representative example of the electrical insulating material 54, the electrical insulating material 54 is not limited thereto. One of functions of the electrical insulating material 54 is to fix the area of the liquid that comes into direct contact with the electrode portion 51 in order to perform stable electrochemical measurement every time with the electrode portion 51. In the embodiment, the part of the lower flow passage forming member 12 located between the electrode portion 51 and the connecting portion 52 is covered with the electrical insulating material 54. Examples of a covering method include a method of immersing the lower flow passage forming member 12 in a polyimide solution in a case where polyimide is used as the electrical insulating material 54. In this case, masking or the like is performed on a part that is not to be covered. Although other examples include a method of printing a polyimide solution only on a part where covering is needed and a method of performing direct contact screen printing, the methods are not limited thereto.

Figure 5A:
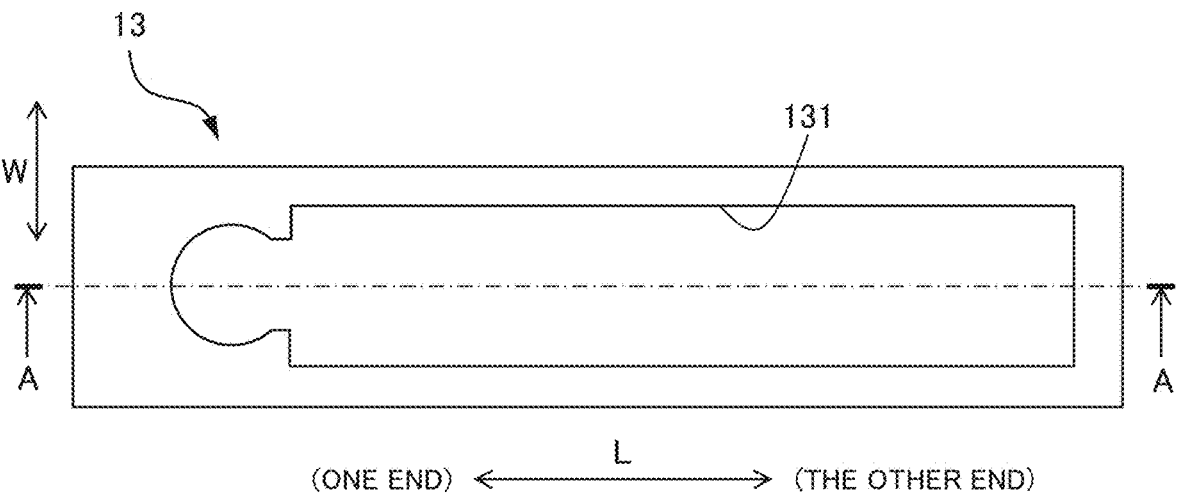
FIG. 5A is a top view of the intermediate member.
Figure 5B:
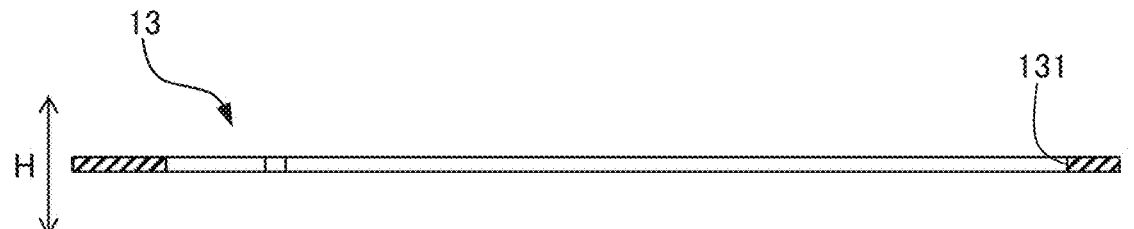
FIG. 5B is a sectional view along A-A in FIG. 5A.

FIG. 5 illustrates the intermediate member 13. FIG. 5A is a top view of the intermediate member 13, and FIG. 5B is a sectional view along A-A in FIG. 5A.

Referring to FIGS. 5A and 5B, the intermediate member 13 has an outer shape that is substantially the same as the outer shape of the upper flow passage forming member 11 in a top view and is formed into a frame shape with an opening portion 131 included therein. The dimension (that is, the thickness) of the intermediate member 13 in the height direction H is appropriately set in accordance with the required flow passage height of the microflow passage 31. The opening portion 131 is formed to have a size with which the first circular hole 111, the pair of first slit holes 112 and 112, and the first U-shaped hole 113 of the upper flow passage forming member 11 can be included in a top view when the upper flow passage forming member 11, the lower flow passage forming member 12, and the intermediate member 13 are stacked.

Also, the upper surface and the lower surface of the intermediate member 13 are formed as surfaces with adhesiveness in the embodiment. In an example, the intermediate member 13 may be formed by disposing double-sided adhesive sheets on an upper surface and a lower surface of a sheet material. In this case, it is possible to freely change the dimension of the intermediate member 13 in the height direction H and thus the flow passage height of the microflow passage 31 by appropriately selecting the sheet material with any optional thickness.

Also, the upper flow passage forming member 11, the lower flow passage forming member 12, and the intermediate member 13 are stacked and integrated by the lower surface of the upper flow passage forming member 11 being bonded to the upper surface of the intermediate member 13 and by the upper surface of the lower flow passage forming member 12 being bonded to the lower surface of the intermediate member 13. At that time, the first liquid absorbing material 4 is disposed on the other end in the longitudinal direction L inside the opening portion 131 of the intermediate member 13.

Figure 6A:
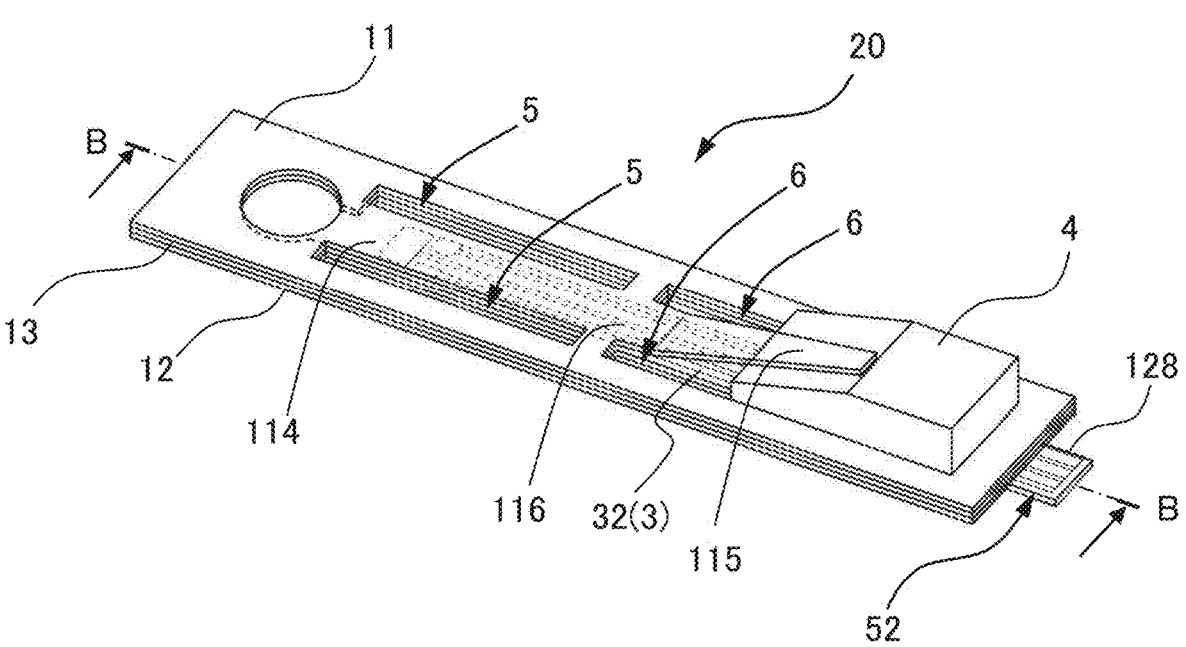
FIG. 6A is a perspective view of the structure.
Figure 6B:
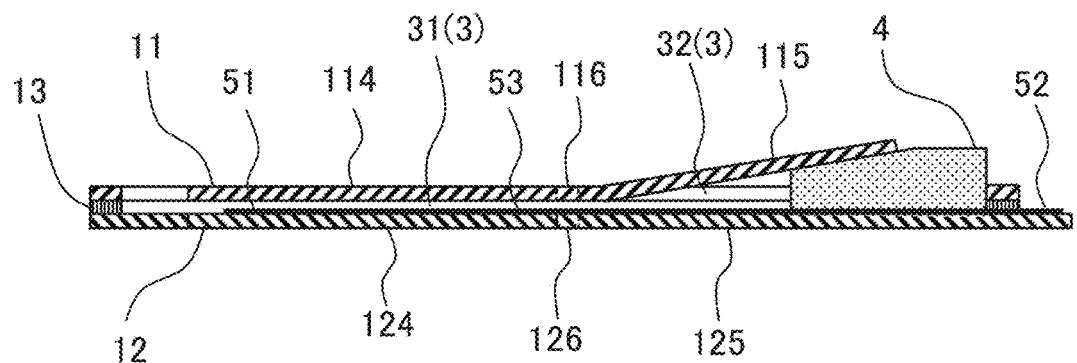
FIG. 6B is a sectional view along B-B in FIG. 6A.

FIG. 6 illustrates a structure 20 (including the first liquid absorbing material 4) in which the upper flow passage forming member 11, the lower flow passage forming member 12, and the intermediate member 13 are stacked and integrated. FIG. 6A is a perspective view of the structure 20, and FIG. 6B is a sectional view along B-B in FIG. 6A.

As described above, the first inter-slit part 114 and the first connecting part 116 of the upper flow passage forming member 11 constitute the upper wall of the microflow passage 31, and the second inter-slit part 124 and the second connecting part 126 of the lower flow passage forming member 12 constitute the lower wall of the microflow passage 31 in the embodiment. Also, the electrode portion 51 is formed on the upper surface of the second inter-slit part 124 of the lower flow passage forming member 12. Therefore, the microflow passage 31 extending horizontally in the longitudinal direction L, having a constant flow passage height, and including the electrode portion 51 disposed therein is formed as illustrated in FIGS. 2 and 6B by the upper flow passage forming member 11, the lower flow passage forming member 12, and the intermediate member 13 being stacked and integrated. Here, the electrode portion 51 disposed inside the microflow passage 31 is electrically connected to the connecting portion 52 via the conducting wire portion 53, and the conducting wire portion 53 extends through the bottom portion of the microflow passage 31 and the bottom portion of the separating flow passage 32 (that is, the bottom portion inside the inner flow passage 3) and then further extends below the first liquid absorbing material 4.

Also, the inner part 115 of the upper flow passage forming member 11 constitutes the upper wall of the separating flow passage 32, and the third inter-slit part 125 of the lower flow passage forming member 12 constitutes the lower wall of the separating flow passage 32 in the embodiment. Here, the inner part 115 of the upper flow passage forming member 11 on the distal end abuts the first liquid absorbing material 4 by the first liquid absorbing material 4 being disposed on the other end side in the longitudinal direction L inside the opening portion 131 of the intermediate member 13 when the upper flow passage forming member 11, the lower flow passage forming member 12, and the intermediate member 13 are stacked and integrated as illustrated in FIGS. 6A and 6B. In this manner, the first liquid absorbing material 4 is deformed so as to collapse, and the inner part 115 of the upper flow passage forming member 11 is bent and deformed upward. Therefore, the separating flow passage 32 is formed as a flow passage extending from the microflow passage 31 toward the first liquid absorbing material 4 and inclined upward such that the upper wall is located at a higher position as it approaches the first liquid absorbing material 4 (as it goes away from the microflow passage 31).

Furthermore, the pair of first sideways spaces 5 and 5 located on both sides of the microflow passage 31 in the width direction W are formed, and the pair of second sideways spaces 6 and 6 located on both sides of the separating flow passage 32 in the width direction W are formed, as illustrated in FIG. 6A by the upper flow passage forming member 11, the lower flow passage forming member 12, and the intermediate member 13 being stacked and integrated. The pair of first sideways spaces 5 and 5 are formed by the pair of first slit holes 112 and 112 of the upper flow passage forming member 11, the pair of second slit holes 122 and 122 of the lower flow passage forming member 12, and the opening portion 131 of the intermediate member 13, and the pair of second sideways spaces 6 and 6 are formed by the pair of linear portions of the first U-shaped hole 113 of the upper flow passage forming member 11, the pair of third slit holes 123 and 123 of the lower flow passage forming member 12, and the opening portion 131 of the intermediate member 13.

Figure 7:
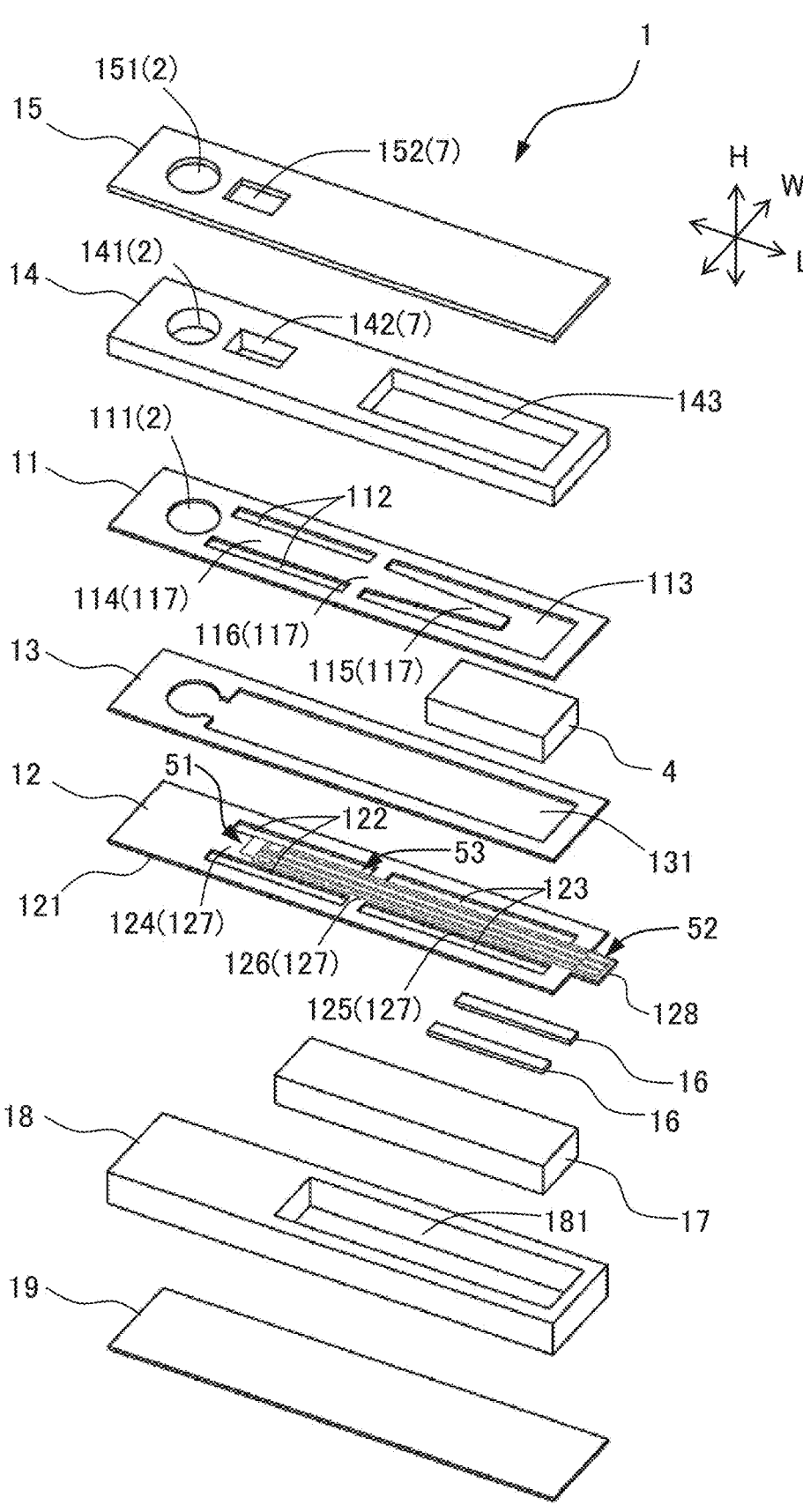
FIG. 7 is an exploded perspective view of the electrochemical assay device according to the first embodiment.

Next, the configuration of the assay device 1 will be further described with reference to FIG. 7. FIG. 7 is an exploded perspective view of the assay device 1.

The assay device 1 further includes an upper housing 14, an upper cover 15, a pair of second liquid absorbing materials 16 and 16, a third liquid absorbing material 17, a lower housing 18, and a lower cover 19 in addition to the first liquid absorbing material 4, the upper flow passage forming member 11, the lower flow passage forming member 12, and the intermediate member 13 described above.

The upper housing 14 is configured of a molded article of a synthetic resin, for example. The upper housing 14 has an outer shape that is substantially the same as the outer shape of the upper flow passage forming member 11 in a top view and is attached to the upper surface of the upper flow passage forming member 11 using a double-sided adhesive sheet or the like, which is not illustrated. A second circular hole 141 with a circular shape in a top view, a first window hole 142 with a rectangular shape in a top view, and an opening hole 143 with a rectangular shape in a top view are formed in the upper housing 14. The second circular hole 141, the first window hole 142, and the opening hole 143 penetrate through the upper housing 14 in the height direction H.

The second circular hole 141 is formed at a position corresponding to the first circular hole 111 of the upper flow passage forming member 11. The second circular hole 141 has a size that is substantially the same as the size of the first circular hole 111 and constitutes a part of the inlet 2 similarly to the first circular hole 111.

The first window hole 142 is formed to be located above the electrode portion 51 of the lower flow passage forming member 12. The first window hole 142 constitutes a part of the observation window 7.

The opening hole 143 is formed at a position corresponding to the first U-shaped hole 113 of the upper flow passage forming member 11. The opening hole 143 has a size with which the first U-shaped hole 113 of the upper flow passage forming member 11 may be included therein in a top view.

The upper cover 15 is configured with a molded article of a synthetic resin, for example. The upper cover 15 is formed into a flat plate shape. The upper cover 15 has an outer shape that is substantially the same as the outer shape of the upper housing 14 in a top view and is attached to the upper surface of the upper housing 14 using a double-sided adhesive sheet or the like, which is not illustrated. A third circular hole 151 with a circular shape in a top view and a second window hole 152 with a rectangular shape in a top view are formed in the upper cover 15. The third circular hole 151 and the second window hole 152 penetrate through the upper cover 15 in the height direction H.

The third circular hole 151 is formed at the position corresponding to the first circular hole 111 in the upper flow passage forming member 11 and the second circular hole 141 in the upper housing 14. The third circular hole 151 has a size that is substantially the same as the sizes of the first circular hole 111 and the second circular hole 141 and constitutes a part of the inlet 2 similarly to the first circular hole 111 and the second circular hole 141. In other words, the inlet 2 is formed by the first circular hole 111 of the upper flow passage forming member 11, the second circular hole 141 of the upper housing 14, and the third circular hole 151 of the upper cover 15 in the embodiment.

The second window hole 152 is formed to be located above the electrode portion 51 of the lower flow passage forming member 12 similarly to the first window hole 142 of the upper housing 14. The second window hole 152 has a size that is substantially the same as the size of the first window hole 142 and constitutes a part of the observation window 7 similarly to the first window hole 142. In other words, the observation window 7 is formed by the first window hole 142 of the upper housing 14 and the second window hole 152 of the upper cover 15 in the embodiment.

The pair of second liquid absorbing materials 16 and 16 are formed of a porous material or the like capable of absorbing a liquid similarly to the first liquid absorbing material 4. The pair of second liquid absorbing materials 16 and 16 are disposed below the first liquid absorbing material 4 in a state where they are in contact with the first liquid absorbing material 4. In the embodiment, the pair of second liquid absorbing materials 16 and 16 are formed into long and thin block shapes and are disposed on the other side in the longitudinal direction L inside the pair of third slit holes 123 and 123 of the lower flow passage forming member 12, respectively.

The third liquid absorbing material 17 is formed of a porous material or the like capable of absorbing a liquid similarly to the first liquid absorbing material 4 and the pair of second liquid absorbing materials 16 and 16. The third liquid absorbing material 17 is formed into a block shape that is larger than the first liquid absorbing material 4 and is disposed below the pair of second liquid absorbing materials 16 and 16 in a state where they are in contact with the pair of second liquid absorbing materials 16 and 16.

The lower housing 18 is configured with a molded article of a synthetic resin, for example. The lower housing 18 has an outer shape that is substantially the same as the outer shapes of the upper flow passage forming member 11 and the upper housing 14 in a top view and is attached to the lower surface of the lower flow passage forming member 12 using a double-sided adhesive sheet or the like, which is not illustrated. The lower housing 18 includes a first accommodating hole 181 with a rectangular shape in a top view to accommodate the third liquid absorbing material 17.

The lower cover 19 is configured with a molded article of a synthetic resin, for example. The lower cover 19 is formed into a flat plate shape. The lower cover 19 has an outer shape that is substantially the same as the outer shape of the lower housing 18 in a top view and is attached to the lower surface of the lower housing 18 using a double-sided adhesive sheet or the like, which is not illustrated.

Also, the assay device 1 illustrated in FIGS. 1 and 2 is obtained by each member (component) illustrated in FIG. 7 being assembled. The obtained assay device 1 includes, in an upper surface, the inlet 2 into which the liquid is to be injected and includes the inner flow passage 3 through which the liquid that has been injected from the inlet 2 flows and the first liquid absorbing material 4 that absorbs the liquid that has passed through the inner flow passage 3 as described above. The inner flow passage 3 includes the microflow passage 31 that communicates with the inlet 2 and the separating flow passage 32 that is provided between the microflow passage 31 and the first liquid absorbing material 4 for separating the liquid inside the inner flow passage 3 when the injection of the liquid is stopped.

Also, the assay device 1 includes the electrode portion 51 that is disposed inside the microflow passage 31, the connecting portion 52 that is connected to the external measurement device, and the conducting wire portion 53 that electrically connects the electrode portion 51 to the connecting portion 52. The connecting portion 52 is provided on the side opposite to the electrode portion 51 with the first liquid absorbing material 4 sandwiched therebetween in the longitudinal direction L (that is, the flow direction of the liquid) and projects outward. Moreover, the conducting wire portion 53 extends in parallel (this is not necessarily parallel in a strict sense and may be substantially parallel; the same applies to the following description) with the longitudinal direction L inside the inner flow passage 3 from the electrode portion 51 toward the connecting portion 52.

Here, an assay reagent may be appropriately injected from the inlet 2 or may be disposed in advance inside the microflow passage 31 in the assay device 1. In a case where the assay reagent is disposed inside the microflow passage 31, the assay reagent may be solid-phase bonded to the upper wall of the microflow passage 31, to the lower wall of the microflow passage 31, to the electrode portion 51, and/or in the vicinity of the electrode portion 51, for example. The assay reagent that is solid-phase bonded may be, for example, an antibody and an antigen, peptide, or an electrochemically active substance, the assay reagent is not limited thereto.

Next, motions of the liquid in the assay device 1 will be described with reference to FIGS. 8 and 9.

FIG. 8 is a diagram for explaining motions of a liquid (hereinafter, referred to as a "first liquid LQ1") injected into the assay device 1 and schematically illustrates the inner flow passage 3 and the like when the assay device 1 is seen from above. Note that FIG. 8 corresponds to a view of a state where the upper flow passage forming member 11 has been excluded from the structure 20 illustrated in FIGS. 6A and 6B from above. Also, the first liquid LQ1 is illustrated by hatching in FIG. 8.

Figures 8A, 8B, 8C, 8D:
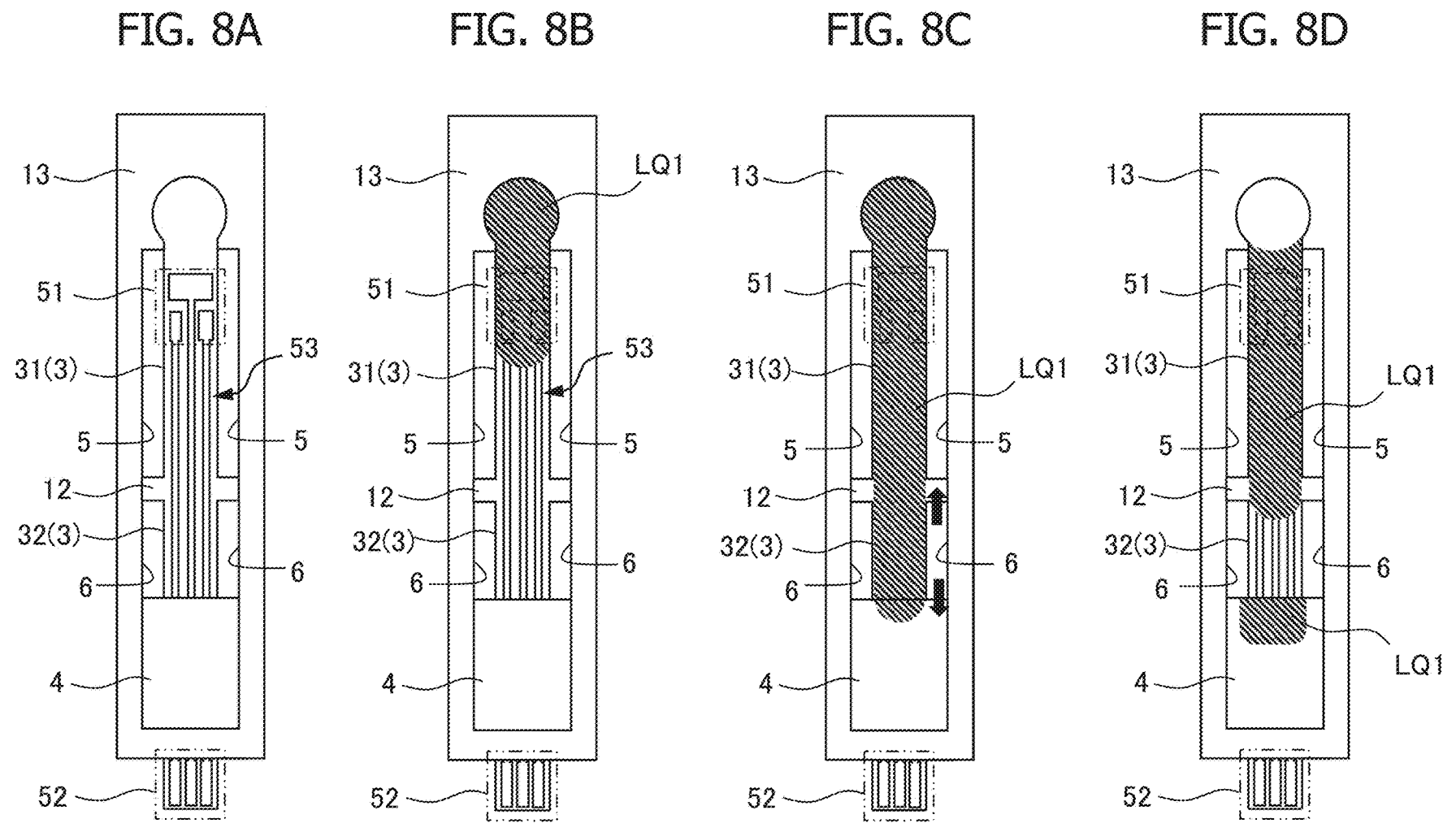

FIG. 8A illustrates a state before the first liquid LQ1 is injected into the inlet 2. Once the first liquid LQ1 is injected from the inlet 2, the first liquid LQ1 is supplied to (flows into) the microflow passage 31 as illustrated in FIG. 8B. Once the injection of the first liquid LQ1 is continued and the first liquid LQ1 is supplied to the microflow passage 31 in an amount exceeding the capacity of the microflow passage 31, the first liquid LQ1 flows into the separating flow passage 32. The first liquid LQ1 that has flowed into the separating flow passage 32 flows toward the first liquid absorbing material 4 through the separating flow passage 32 and comes into contact with (is absorbed by) the first liquid absorbing material 4. Then, a force of trying to stay inside the microflow passage 31 due to an interfacial tension and a capillary force of the first liquid absorbing material 4 act on the first liquid LQ1 inside the inner flow passage 3, and a state where the first liquid LQ1 is pulled between the microflow passage 31 and the first liquid absorbing material 4 as illustrated by the arrow in FIG. 8C is achieved. Thereafter, once the injection of the first liquid LQ1 is stopped, the first liquid LQ1 inside the inner flow passage 3 is divided by the separating flow passage 32, a part thereof is absorbed by the first liquid absorbing material 4, and the rest is left inside the microflow passage 31 as illustrated in FIG. 8D. In other words, the first liquid LQ1 inside the inner flow passage 3 is separated into a part to be left inside the microflow passage 31 and a part to be absorbed by the first liquid absorbing material 4.

As a result, a predetermined amount of first liquid LQ1 stays inside the microflow passage 31, in other words, on the electrode portion 51. Therefore, the assay device 1 according to the first embodiment can stably perform an assay based on the electrochemical method on the first liquid LQ1 by an electrochemistry-related measurement device, that is, the electrochemical analyzer, the electrochemiluminescence analyzer, or the like being connected to the connecting portion 52.

FIG. 9 is a diagram for explaining motions of the first liquid LQ1 and a new liquid (hereinafter, referred to as a "second liquid LQ2") when the second liquid LQ2 is injected after the injection of the first liquid LQ1 into the assay device 1 is stopped and schematically illustrates the inner flow passage 3 and the like when the assay device 1 is seen from above. Note that FIG. 9 also corresponds to the state where the upper flow passage forming member 11 has been removed from the structure 20 illustrated in FIGS. 6A and 6B similarly to FIG. 8 seen from above. Also, the first liquid LQ1 is illustrated by the same hatching as that in FIG.

8, and the second liquid LQ2 is illustrated by hatching that is different from the hatching for the first liquid LQ1 in FIG. 9.

Figures 9A, 9B, 9C, 9D:
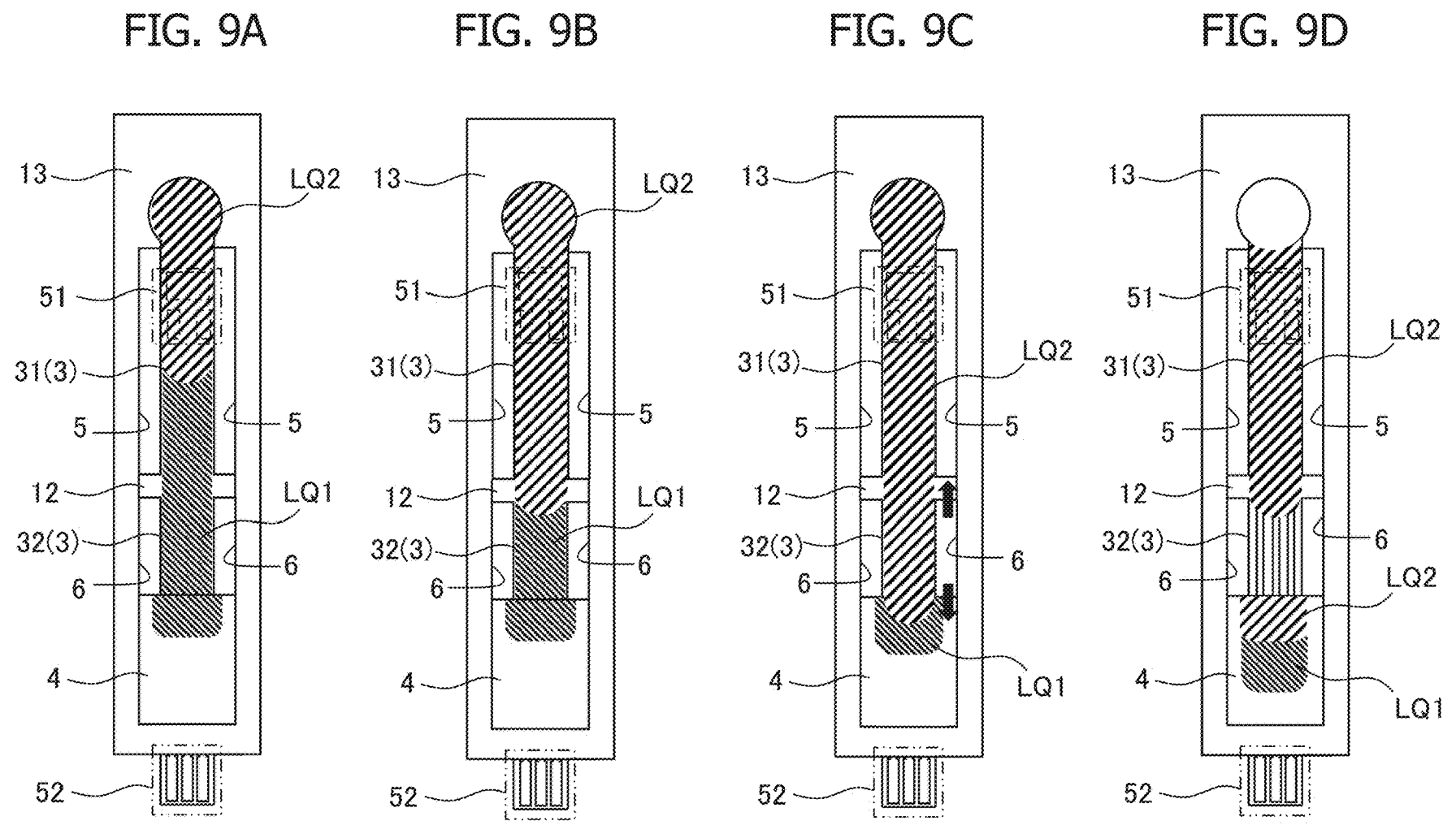

Once the second liquid LQ2 is injected after the injection of the first liquid LQ1 is stopped, the second liquid LQ2 is supplied to the microflow passage 31 as illustrated in FIG. 9A. Here, although the first liquid LQ1 is left inside the microflow passage 3 as described above, the first liquid LQ1 left inside the microflow passage 31 is pushed out from the microflow passage 31 by the newly supplied second liquid LQ2, flows through the separating flow passage 32, and is then absorbed by the first liquid absorbing material 4.

Once the injection of the second liquid LQ2 is continued, and the second liquid LQ2 in an amount exceeding the capacity of the microflow passage 31, in other words, the second liquid LQ2 in an amount exceeding the amount of the first liquid LQ1 left inside the microflow passage 31 is supplied to the microflow passage 31, the first liquid LQ1 left inside the microflow passage 31 is pushed out from the microflow passage 31 as illustrated in FIG. 9B. Then, once the second liquid LQ2 is further injected, the second liquid LQ2 flows into the separating flow passage 32 from the microflow passage 31. The second liquid LQ2 that has flowed into the separating flow passage 32 flows toward the first liquid absorbing material 4 through the separating flow passage 32 and comes into contact with (is absorbed by) the first liquid absorbing material 4. Then, a force of trying to stay inside the microflow passage 31 due to an interfacial tension and a capillary force of the first liquid absorbing material 4 act on the second liquid LQ2 inside the inner flow passage 3, and a state where the second liquid LQ2 is pulled between the microflow passage 31 and the first liquid absorbing material 4 as illustrated by the arrow in FIG. 9C is achieved. Once the injection of the second liquid LQ2 is stopped thereafter, the second liquid LQ2 inside the inner flow passage 3 is divided by the separating flow passage 32, a part thereof is absorbed by the first liquid absorbing material 4, and the rest is left inside the microflow passage 31 as illustrated in FIG. 9D. In other words, the second liquid LQ2 inside the inner flow passage 3 is separated into a part to be left inside the microflow passage 31 and a part absorbed by the first liquid absorbing material 4.

As a result, the first liquid LQ1 inside the microflow passage 31 is replaced with the second liquid LQ2, and a predetermined amount of second liquid LQ2 stays inside the microflow passage 31, in other words, on the electrode portion 51. Therefore, it is possible to wash the microflow passage 31 by continuously injecting distilled water, for example, as the second liquid LQ2 according to the assay device 1 in the first embodiment. Also, it is possible to easily replace the liquid inside the microflow passage 31 and to stably perform an assay based on the electrochemical method on a new liquid after the replacement according to the assay device 1 in the first embodiment.

Note that the assay device 1 according to the first embodiment described above includes the observation window 7 for observing the vicinity of the electrode portion 51 inside the microflow passage 31. However, the present invention is not limited thereto. In a case where there is no need to observe the vicinity of the electrode portion 51 inside the microflow passage 31, for example, the observation window 7 may be omitted. In this case, the upper flow passage forming member 11 is not necessarily formed of a transparent synthetic resin.

Also, in the assay device 1 according to the first embodiment described above, the electrode portion 51, the connecting portion 52, and the conducting wire portion 53 are formed integrally with the lower flow passage forming member 12. However, the present invention is not limited thereto. The electrode portion 51, the connecting portion 52, and the conducting wire portion 53 may be formed integrally with the upper flow passage forming member 11 instead of the lower flow passage forming member 12. In this case, the upper flow passage forming member 11 may be formed of a synthetic resin colored to a white color, a black color, or the like, the upper flow passage forming member 11 may be provided with the projecting portion where the connecting portion 52 is formed, the lower flow passage forming member 12 may be formed of a transparent synthetic resin, and the observation window 7 to observe the vicinity of the electrode portion 51 inside the microflow passage 31 may be formed to open in the lower surface of the assay device 1, for example.

Figure 10:
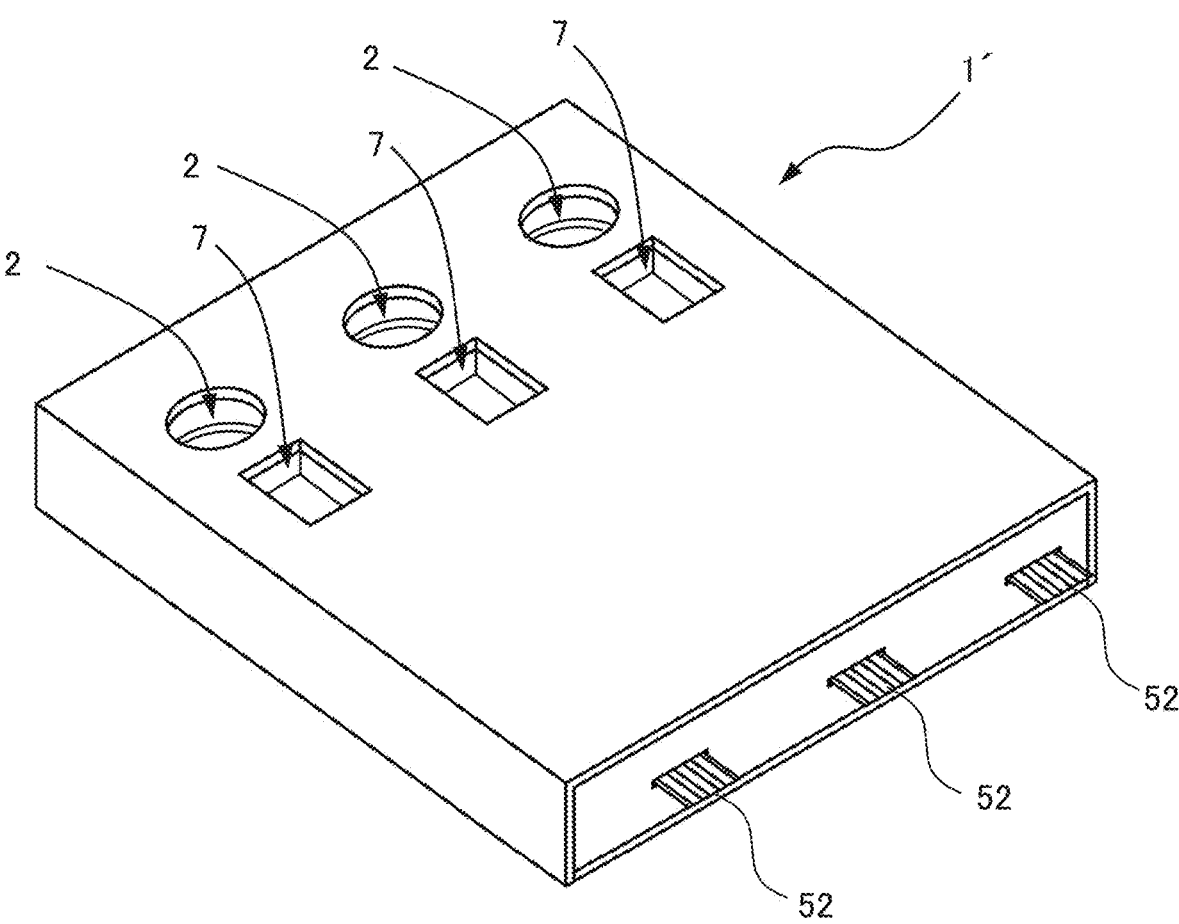
FIG. 10 is a diagram illustrating a modification of the electrochemical assay device according to the first embodiment.

Furthermore, a plurality of (three in this case) assay devices 1 according to the first embodiment may be aligned, integrated, and configured as a single assay device 1' as illustrated in FIG. 10. In this manner, it is possible to perform assays on a plurality of liquids at the same time and in a parallel manner, which is convenient.

Second Embodiment

Figure 11:
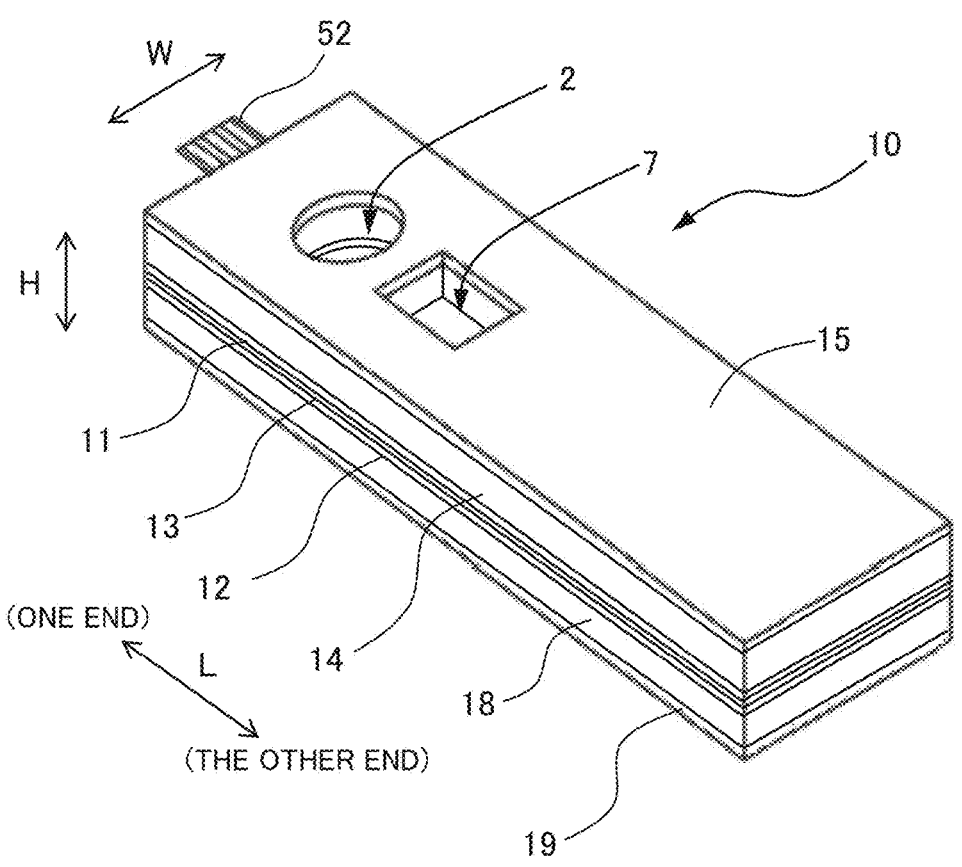
FIG. 11 is a perspective view of an electrochemical assay device according to a second embodiment.
Figure 12:
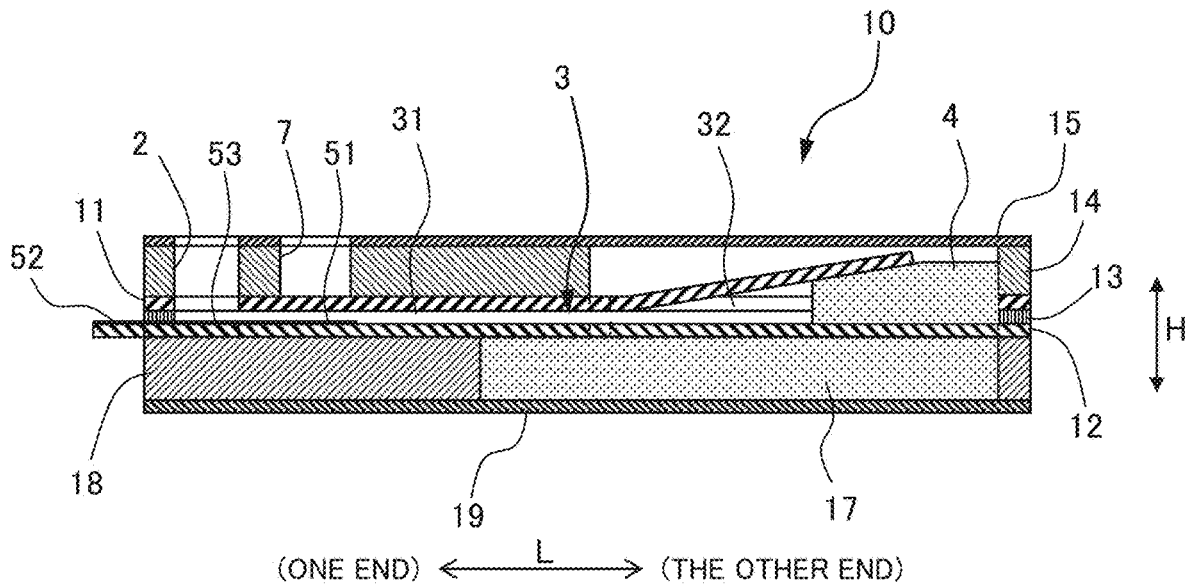
FIG. 12 is a schematic sectional view of the electrochemical assay device according to the second embodiment.
Figure 13:
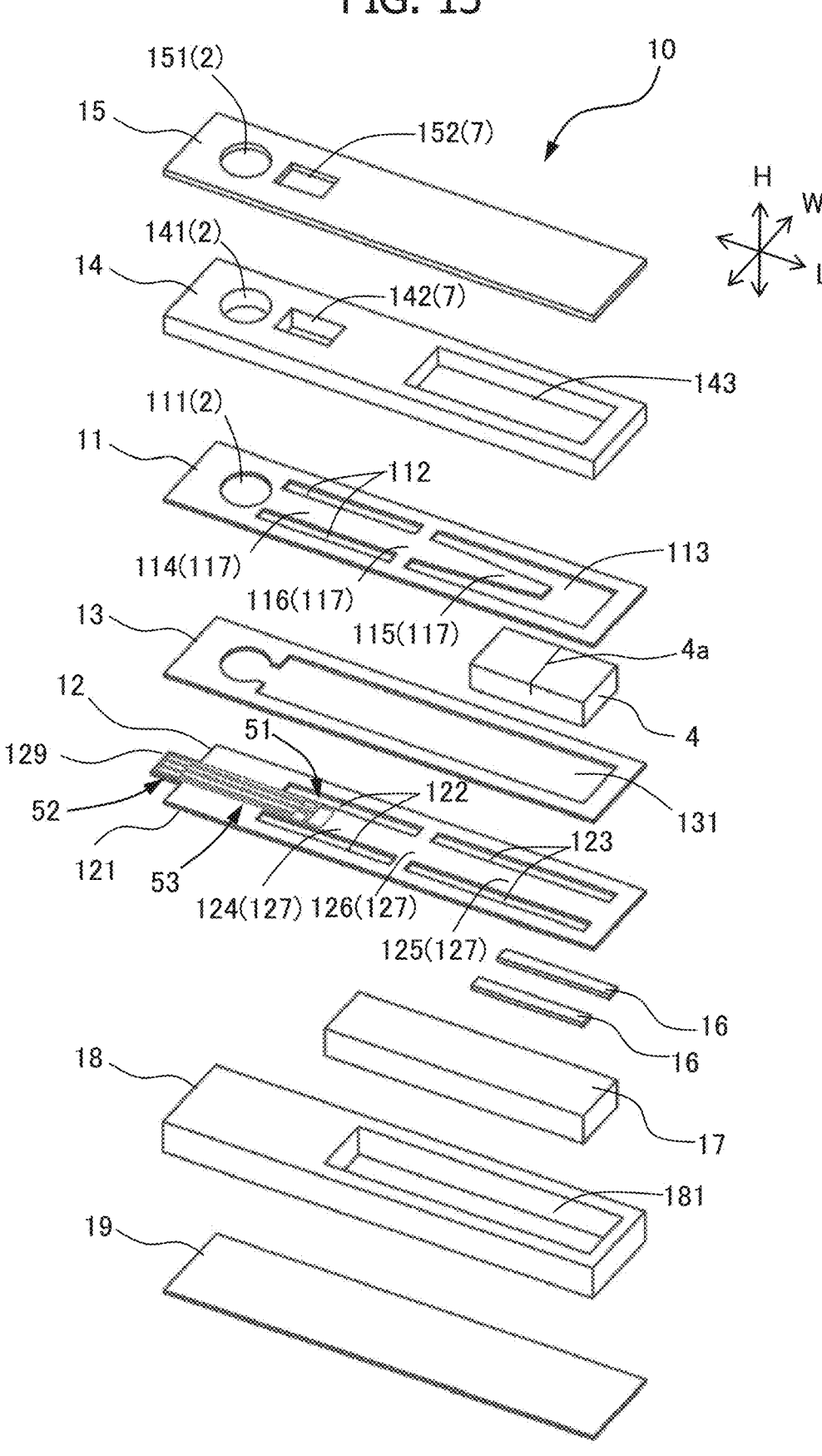
FIG. 13 is an exploded perspective view of the electrochemical assay device according to the second embodiment.

FIGS. 11 to 13 illustrate an assay device 10 according to a second embodiment. FIG. 11 is a perspective view of the assay device 10 according to the second embodiment, FIG. 12 is a sectional view of the assay device 10 according to the second embodiment, and FIG. 13 is an exploded perspective view of the assay device 10 according to the second embodiment. In FIGS. 11 to 13, the same reference signs are used for elements that are common to those of the assay device 1 according to the first embodiment. Hereinafter, configurations that are different from those of the assay device 1 according to the first embodiment will be mainly described.

Main differences between the assay device 1 according to the first embodiment and the assay device 10 according to the second embodiment are as follows.

In the assay device 1 according to the first embodiment, the lower flow passage forming member 12 includes the projecting portion 128 that projects outward from the end portion of the main body portion 121 on the other end in the longitudinal direction L, and the connecting portion 52 is formed (printed) on the upper surface of the projecting portion 128. Therefore, in the assay device 1 according to the first embodiment, the connecting portion 52 is disposed on the side opposite to the electrode portion 51 with the first liquid absorbing material 4 sandwiched therebetween in the longitudinal direction L (that is, the flow direction of the liquid) and projects outward. Also, the conducting wire portion 53 extends in parallel with the longitudinal direction L from the electrode portion 51 toward the connecting portion 52. Specifically, the conducting wire portion 53 is formed to extend over the upper surface of the second inter-slit part 124 of the main body portion 121, over the upper surface of the second connecting part 126, and over the upper surface of the third inter-slit part 125 from the electrode portion 51 and reach the connecting portion 52.

On the other hand, in the assay device 10 according to the second embodiment, a lower flow passage forming member 12 is provided with a projecting portion 129 that projects outward from an end portion of a main body portion 121 on the one end in the longitudinal direction L rather than the projecting portion 128 that projects outward from the end portion of the main body portion 121 on the other end in the longitudinal direction L, and a connecting portion 52 is formed (printed) on the upper surface of the projecting portion 129. Therefore, the connecting portion 52 is disposed on the side opposite to the electrode portion 51 with an inlet 2 sandwiched therebetween in the longitudinal direction L (that is, the flow direction of the liquid) and projects outward in the assay device 10 according to the second embodiment. Also, the conducting wire portion 53 extends in parallel with the longitudinal direction L from the electrode portion 51 toward the connecting portion 52. Specifically, the conducting wire portion 53 is formed to extend over an upper surface of a part of the main body portion 121 including a part below the inlet 2 on the one side in the longitudinal direction L from the electrode portion 51 and reaches the connecting portion 52.

Configurations other than the configurations of the assay device 10 according to the second embodiment described above are basically the same as those of the assay device 1 according to the first embodiment.

Effects that are similar to those of the assay device 1 according to the first embodiment are obtained by the assay device 10 according to the second embodiment. In other words, it is possible to stably perform an assay based on the electrochemical method on the injected liquid and to perform washing of the microflow passage 31 as well. Moreover, it is also possible to simply replace the liquid inside the microflow passage 31 and to stably perform an assay based on the electrochemical method on a new liquid after the replacement.

Figure 14:
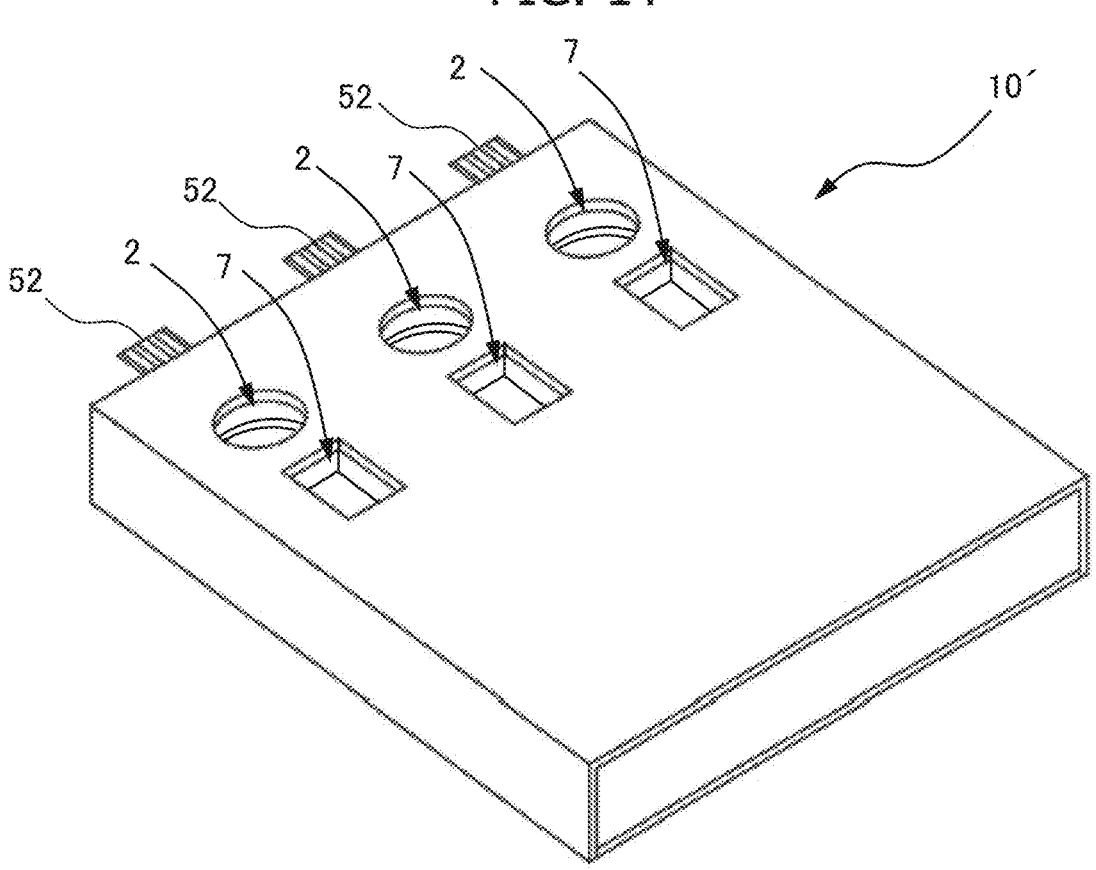
FIG. 14 is a diagram illustrating a modification of the electrochemical assay device according to the second embodiment.

Note that modifications that can be applied to the assay device 1 according to the first embodiment can also be applied to the assay device 10 according to the second embodiment. Also, a plurality of (three in this case) assay devices 10 according to the second embodiment may be aligned in the width direction, integrated, and configured as a single assay device 10' as illustrated in FIG. 14.

Third Embodiment

Figure 15:
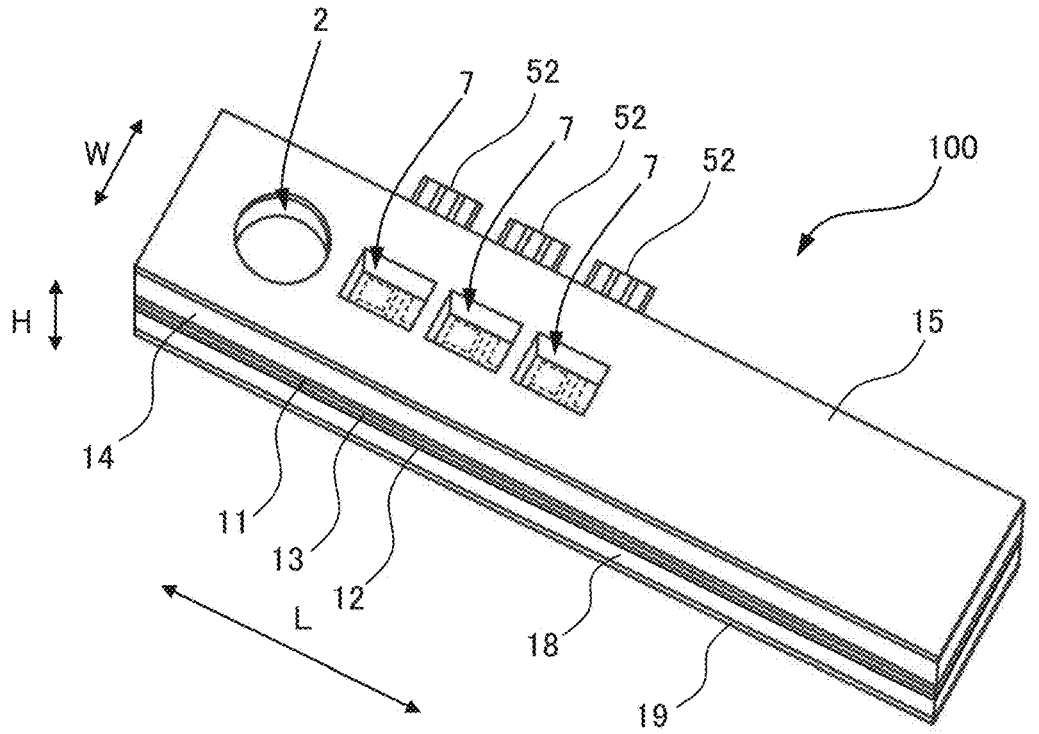
FIG. 15 is a perspective view of an electrochemical assay device according to a third embodiment.
Figure 16:
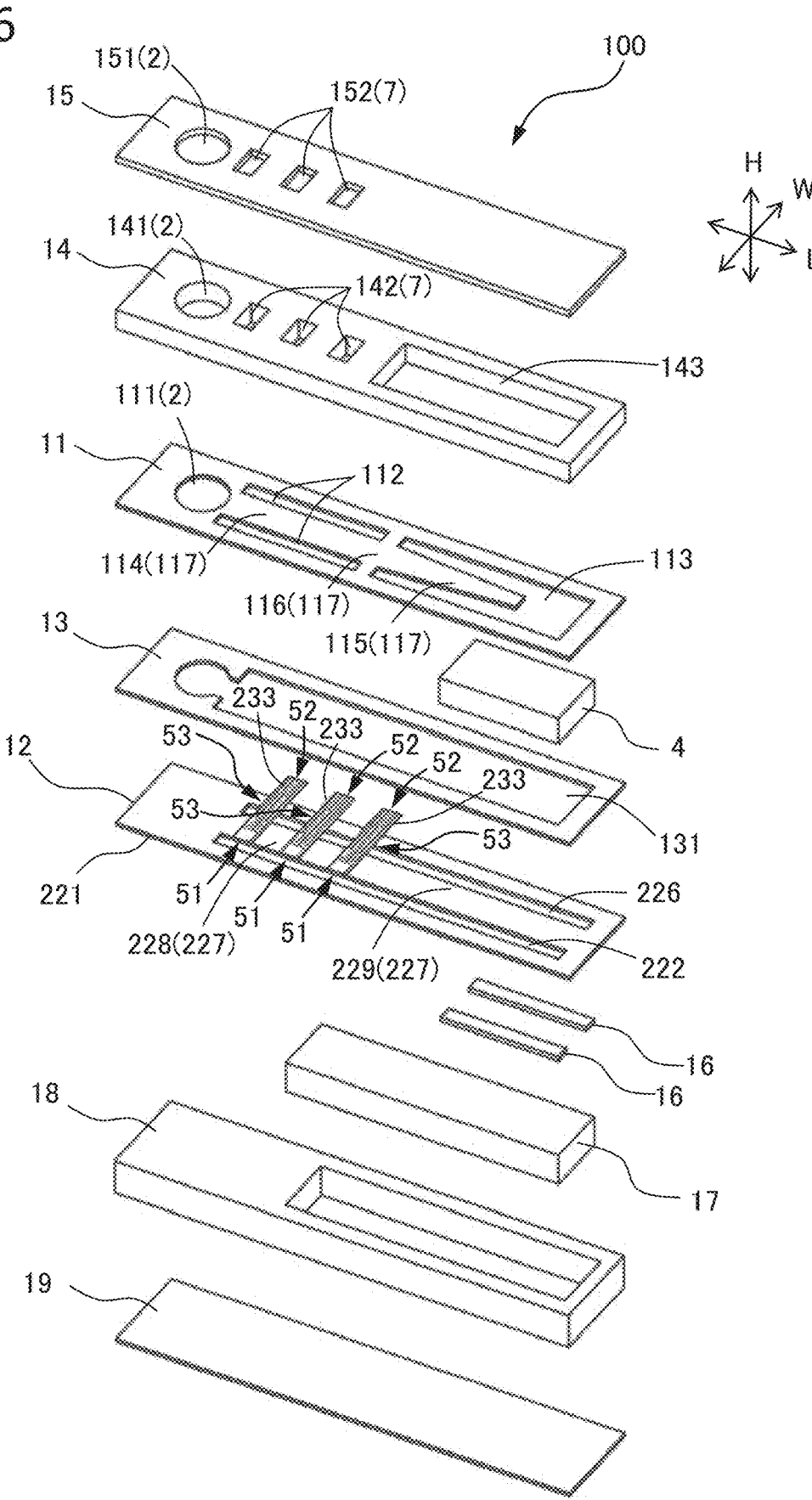
FIG. 16 is an exploded perspective view of the electrochemical assay device according to the third embodiment.

FIGS. 15 and 16 illustrate an assay device 100 according to a third embodiment. FIG. 15 is a perspective view of the assay device 100 according to the third embodiment, and FIG. 16 is an exploded perspective view of the assay device 100 according to the third embodiment. In FIGS. 15 and 16, the same reference signs are used for elements that are common to those of the assay device 1 according to the first embodiment. Hereinafter, configurations that are different from those of the assay device 1 according to the first embodiment will be mainly described.

Main differences between the assay device 1 according to the first embodiment and the assay device 100 according to the third embodiment are as follows. The assay device 1 according to the first embodiment includes one observation window 7, one electrode portion 51, one connecting portion 52, and one conducting wire portion 53. On the other hand, the assay device 100 according to the third embodiment includes a plurality of (three in this case) observation windows 7, electrode portions 51, connecting portions 52, and conducting wire portions 53. Therefore, a lower flow passage forming member 12, an upper housing 14, and an upper cover 15 of the assay device 100 according to the third embodiment are different from those of the assay device 1 according to the first embodiment. Hereinafter, specific description will be given.

Figure 17A:
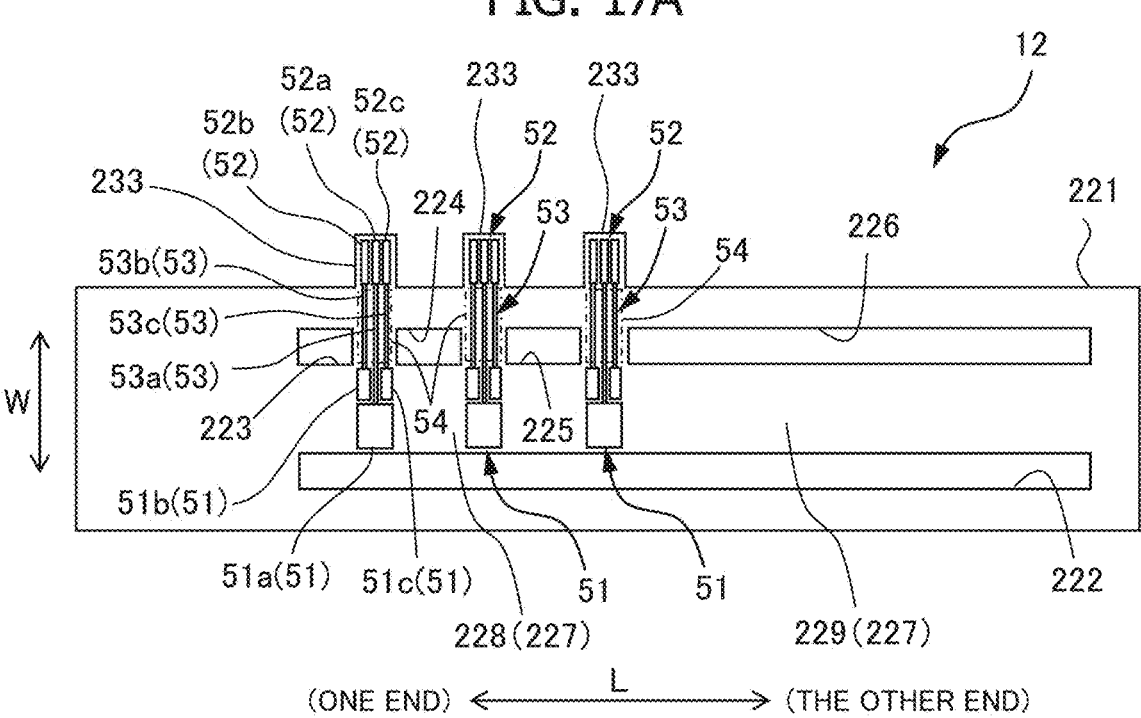
FIG. 17A is a top view of the lower flow passage forming member.
Figure 17B:
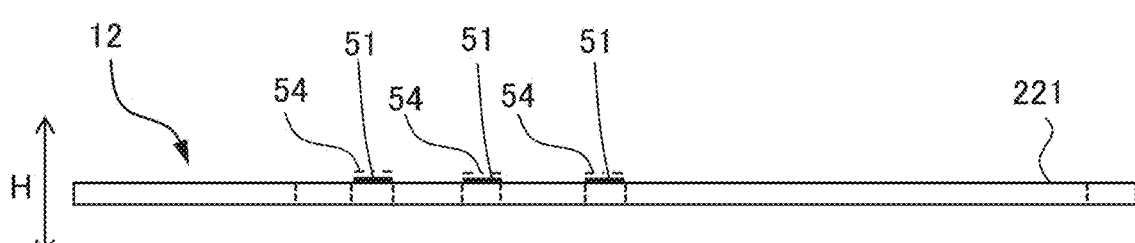
FIG. 17B is a side view of the lower flow passage forming member.
Figure 17C:
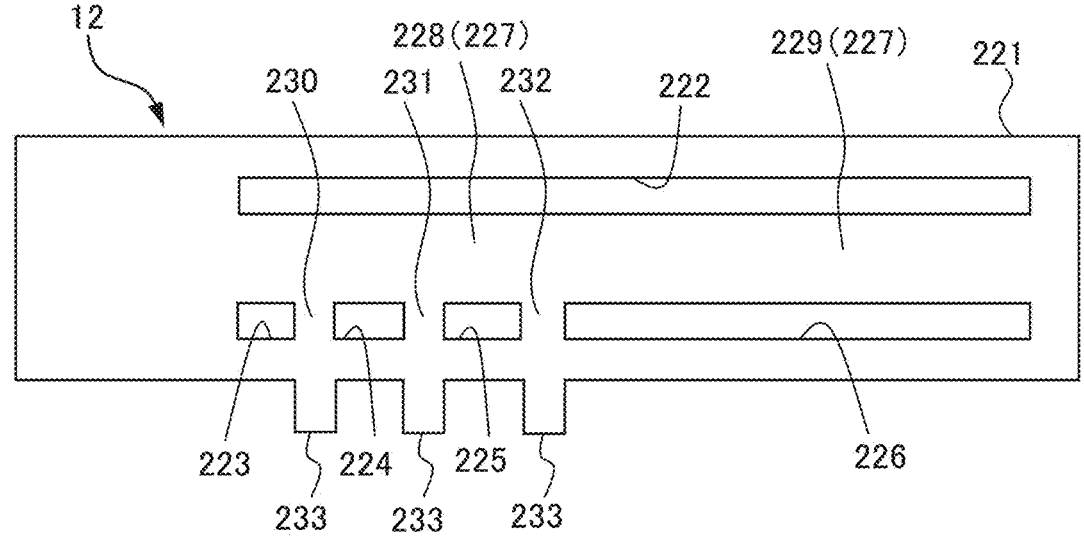
FIG. 17C is a bottom view of the lower flow passage forming member.

FIG. 17 illustrates the lower flow passage forming member 12 of the assay device 100 according to the third embodiment. FIG. 17A is a top view of the lower flow passage forming member 12, FIG. 17B is a side view of the lower flow passage forming member 12, and FIG. 17C is a bottom view of the lower flow passage forming member 12.

Referring to FIGS. 17A to 17C, the lower flow passage forming member 12 of the assay device 100 according to the third embodiment includes a main body portion 221 with an outer shape that is substantially the same as the outer shape of the upper flow passage forming member 11 in a top view. Also, a fourth slit hole 222 with a rectangular shape in a top view, first to third rectangular holes 223 to 225 with rectangular shapes in a top view, and a fifth slit hole 226 with a rectangular shape in a top view are formed in the main body portion 221 of the lower flow passage forming member 12. The fourth slit hole 222, the first to third rectangular holes 223 to 225, and the fifth slit hole 226 penetrate through the lower flow passage forming member 12 in the height direction H.

The fourth slit hole 222 is formed to correspond to one of the pair of first slit holes 112 and 112 of the upper flow passage forming member 11 and one of the pair of linear parts of the first U-shaped hole 113 of the upper flow passage forming member 11. In other words, the fourth slit hole 222 is formed to be located under one of the pair of first slit holes 112 and 112 of the upper flow passage forming member 11 and below one of the pair of linear parts of the first U-shaped hole 113 of the upper flow passage forming member 11 when the upper flow passage forming member 11, the lower flow passage forming member 12, and the intermediate member 13 are stacked.

The first to third rectangular holes 223 to 225 and the fifth slit hole 226 are disposed at intervals from each other in this order from the one end toward the other end in the longitudinal direction L and are formed to correspond to the other of the pair of first slit holes 112 and 112 of the upper flow passage forming member 11 and the other of the pair of linear parts of the first U-shaped hole 113 of the upper flow passage forming member 11.

Specifically, the first to third rectangular holes 223 to 225 are formed to be located below the other of the pair of first slit holes 112 and 112 of the upper flow passage forming member 11 when the upper flow passage forming member 11, the lower flow passage forming member 12, and the intermediate member 13 are stacked. The fifth slit hole 226 is formed such that a part thereof on the one end in the longitudinal direction L is located below the other of the pair of first slit holes 112 and 112 of the upper flow passage forming member 11 and a most part of the rest thereof is located below the other of the pair of linear parts of the first U-shaped hole 113 of the upper flow passage forming member 11 when the upper flow passage forming member 11, the lower flow passage forming member 12, and the intermediate member 13 are stacked.

Then, a lower wall portion 227 constituting the lower wall of the inner flow passage 3 is formed by a part sandwiched by the fourth slit hole 222, the first to third rectangular holes 223 to 225, and the fifth slit hole 226 in the embodiment. In other words, the lower flow passage forming member 12 includes the lower wall portion 227 constituting the lower wall of the inner flow passage 3.

Also, the lower wall of the microflow passage 31 is configured with a one-end part 228 that is a part sandwiched by the part of the fourth slit hole 222 on the one end in the longitudinal direction L and the parts of the first to third rectangular holes 223 to 225 and the fifth slit hole 226 on the one end in the longitudinal direction L, that is, a part of the lower wall portion 227 on the one side in the longitudinal direction L, and the lower wall of the separating flow passage 32 is configured with an other-end part 229 that is a part sandwiched by the part of the fourth slit hole 222 on the other end in the longitudinal direction L and the most part of the rest of the fifth slit hole 226, that is, a part of the lower wall portion 227 on the other end in the longitudinal direction.

Here, a width of the lower wall portion 227 constituting the lower wall of the inner flow passage 3 is the same as a width of the first inter-slit part 114 of the upper flow passage forming member 11. Also, a dimension of a first inter-hole part 230 in the longitudinal direction L between the first rectangular hole 223 and the second rectangular hole 224, a dimension of a second inter-hole part 231 in the longitudinal direction L between the second rectangular hole 224 and the third rectangular hole 225, and a dimension of a third inter-hole part 232 in the longitudinal direction L between the third rectangular hole 225 and the fifth slit hole 226 are smaller than the width of the lower wall portion 227, specifically, are set to be equal to or less than ⅔ the width of the lower wall portion 227, and are preferably set to be equal to or less than ½ the width of the lower wall portion 227.

In addition, the lower flow passage forming member 12 includes three projecting portions 233 projecting outward from the end portion of the main body portion 221 on one end in the width direction W. The projecting portions 233 are formed into rectangular shapes in a top view and are located on a lateral side of the one-end part 228 constituting the lower wall of the microflow passage 31.

Furthermore, electrode portions 51, connecting portions 52, and conducting wire portions 53 are formed in the same number as (that is, three) the number of the projecting portions 233 in the lower flow passage forming member 12. The electrode portions 51, the connecting portions 52, and the conducting wire portions 53 are formed integrally with the lower flow passage forming member 12 by the conductive material being printed on the lower flow passage forming member 12.

The three electrode portions 51 are formed at intervals from each other in the longitudinal direction L on the upper surface of the one-side part 228 constituting the lower wall of the microflow passage 31. Each of the electrode portions 51 is formed at a position corresponding to any of the three projecting portions 233 and includes a working electrode 51a, an opposite electrode 51b, and a reference electrode 51c.

The three connecting portions 52 are formed on upper surfaces of any of the three projecting portions 233, respectively. Each connecting portion 52 is provided at a position separated from any of the three electrode portions 51 in the width direction W, and includes a first terminal portion 52a corresponding to the working electrode 51a, a second terminal portion 52b corresponding to the opposite electrode 51b, and a third terminal portion 52c corresponding to the reference electrode 51c.

The three conducting wire portions 53 are formed to electrically connect the three electrode portions 51 to the corresponding connecting portions 52, respectively. In the embodiment, the three conducting wire portions 53 are formed to extend over the upper surface of the first inter-hole part 230, over the upper surface of the second inter-hole part 231, and over the upper surface of the third inter-hole part 232 and connect the three electrode portions 51 to the corresponding connecting portions 52, respectively. Each conducting wire portion 53 includes a first conducting wire portion 53a that connects the working electrode 51a to the first terminal portion 52a, a second conducting wire portion 53b that connects the opposite electrode 51b to the second terminal portion 52b, and a third conducting wire portion 53c that connects the reference electrode 51c to the third terminal portion 52c. Here, a most part of each conducting wire portion 53 (first to third conducting wire portions 53a to 53c) is covered with an electrical insulating material 54 as illustrated by the one-dotted dashed line in FIGS. 17A and 17B.

Also, as illustrated in FIG. 16, three first window holes 142 located above the three electrode portions 51 of the lower flow passage forming member 12 and each constituting the observation windows 7 are formed in an upper housing 14, and three second window holes 152 located above the three electrode portions 51 of the lower flow passage forming member 12 and each constituting the observation windows 7 are formed in the upper cover 15, in the assay device 100 according to the third embodiment.

In the assay device 100 according to the third embodiment, the three electrode portions 51 are formed at intervals from each other in the longitudinal direction L on the upper surface of the one-side part 228 constituting the lower wall of the microflow passage 31. In other words, the three electrode portions 51 are disposed inside the microflow passage 31 and are provided to be separated from each other in the longitudinal direction L (that is, the flow direction of the liquid). Also, the three connecting portions 52 are provided to be separated from any of the three electrode portions 51, respectively, in the width direction W perpendicularly intersecting the longitudinal direction L. Here, the three connecting portions 52 are formed on upper surfaces of the three projecting portions 233 projecting outward from an end portion of the main body portion 221 of the lower flow passage forming member 12 on the one side in the width direction W and project outward. Also, the three conducting wire portions 53 extend in parallel with the width direction W and electrically connect the corresponding electrode portions 51 to the connecting portions 52, respectively.

Configurations other than the configurations of the assay device 100 according to the third embodiment described above are basically the same as those of the assay device 1 according to the first embodiment.

Effects that are similar to those of the assay device 1 according to the first embodiment are obtained by the assay device 100 according to the third embodiment as well. Also, it is possible to perform assays based on the electrochemical method for a maximum of three items on the injected liquid according to the assay device 100 in the third embodiment.

Figure 18:
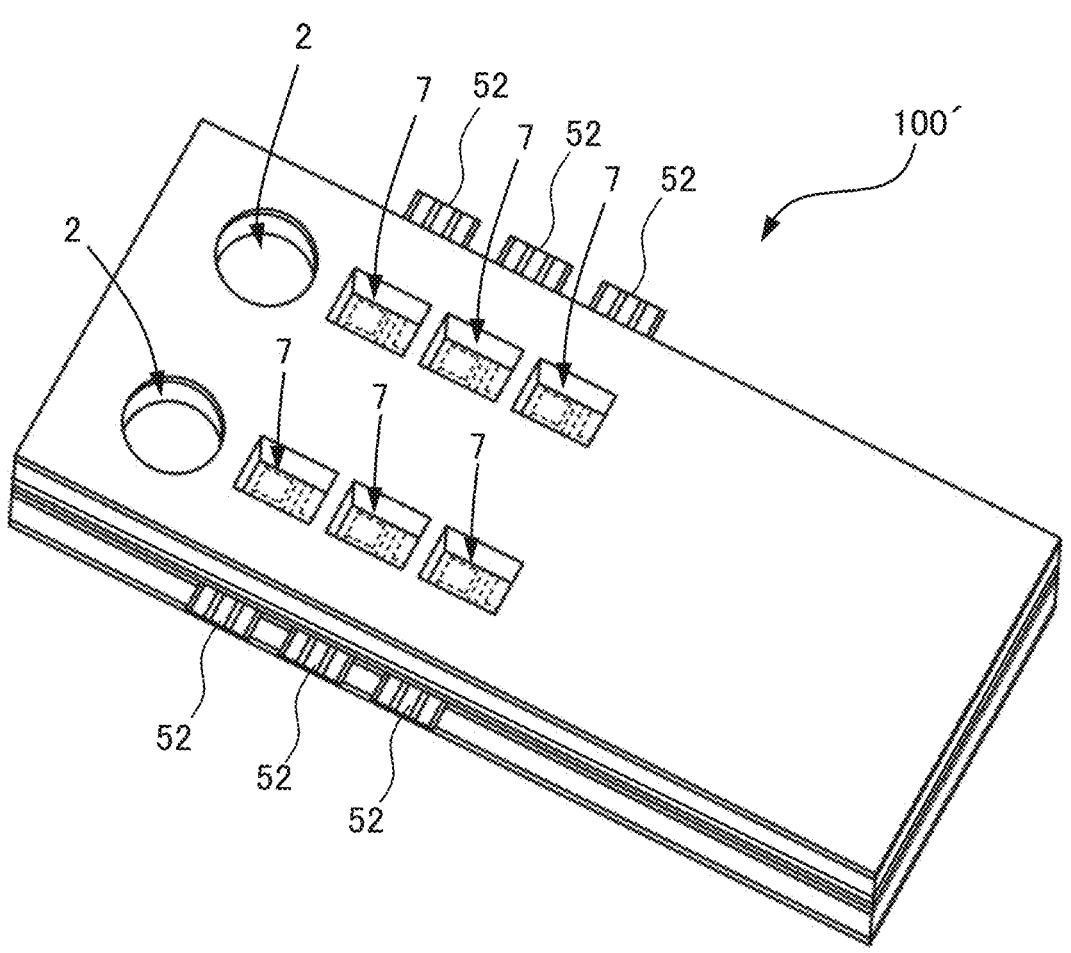
FIG. 18 is a diagram illustrating a modification of the electrochemical assay device according to the third embodiment.

Note that the assay device 100 according to the third embodiment described above includes three electrode portions 51, three connecting portions 52, and three conducting wire portions 53. However, the present invention is not limited thereto. The assay device 100 according to the third embodiment may include one electrode portion 51, one connecting portion 52, and one conducting wire portion 53 similarly to the assay device 1 according to the first embodiment and the assay device 10 according to the second embodiment, or may include two electrode portions 51, two connecting portions 52, and two conducting wire portions 53, or may include four or more electrode portions 51, four or more connecting portions 52, and four or more conducting wire portions. Moreover, modifications that can be applied to the assay device 1 according to the first embodiment can also be applied to the assay device 100 according to the third embodiment. Furthermore, two assay devices 100 according to the third embodiment with mutually opposite dispositions of the connecting portions 52 may be aligned in the width direction, integrated, and configured as a single assay device 100' as illustrated in FIG. 18.

Fourth Embodiment

Figure 19:
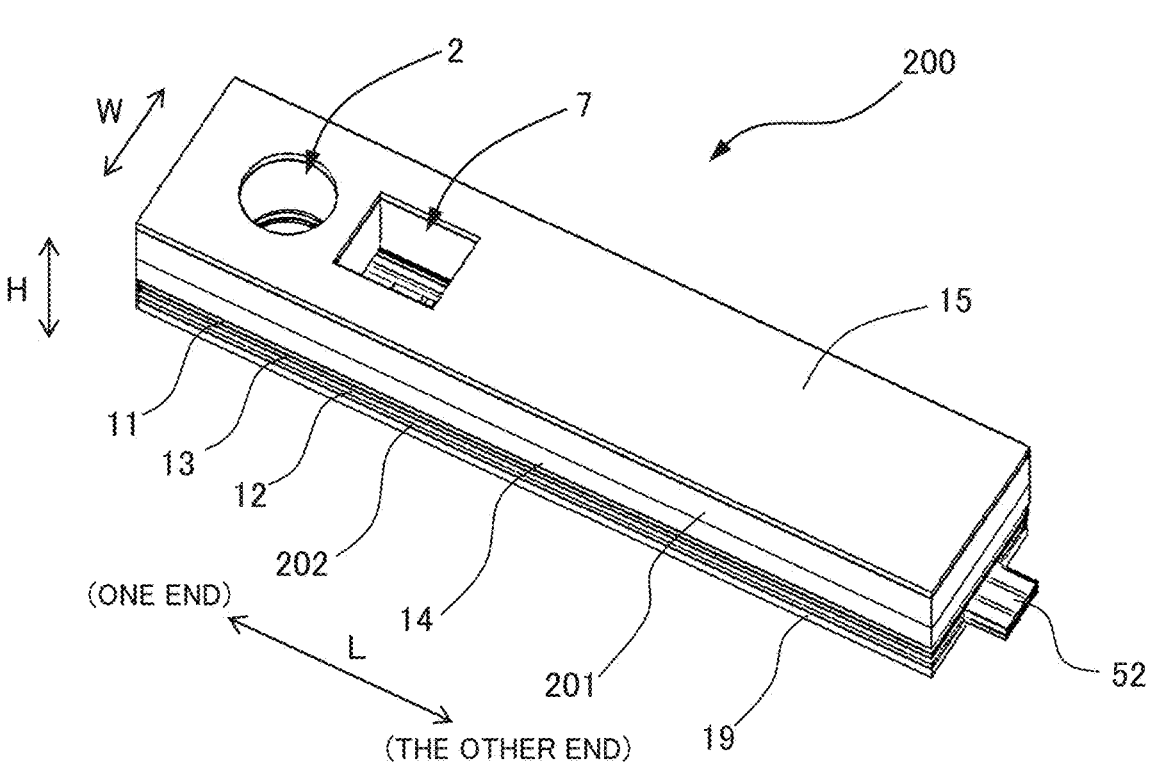
FIG. 19 is a perspective view of an electrochemical assay device according to a fourth embodiment.
Figure 20:
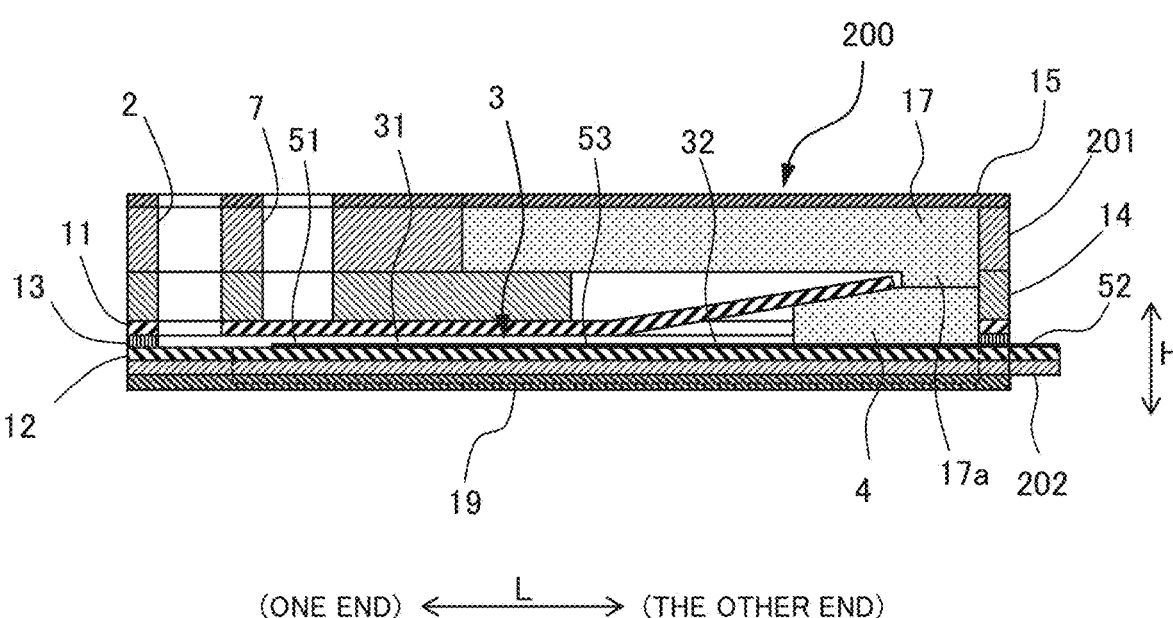
FIG. 20 is a schematic sectional view of the electrochemical assay device according to the fourth embodiment.
Figure 21:
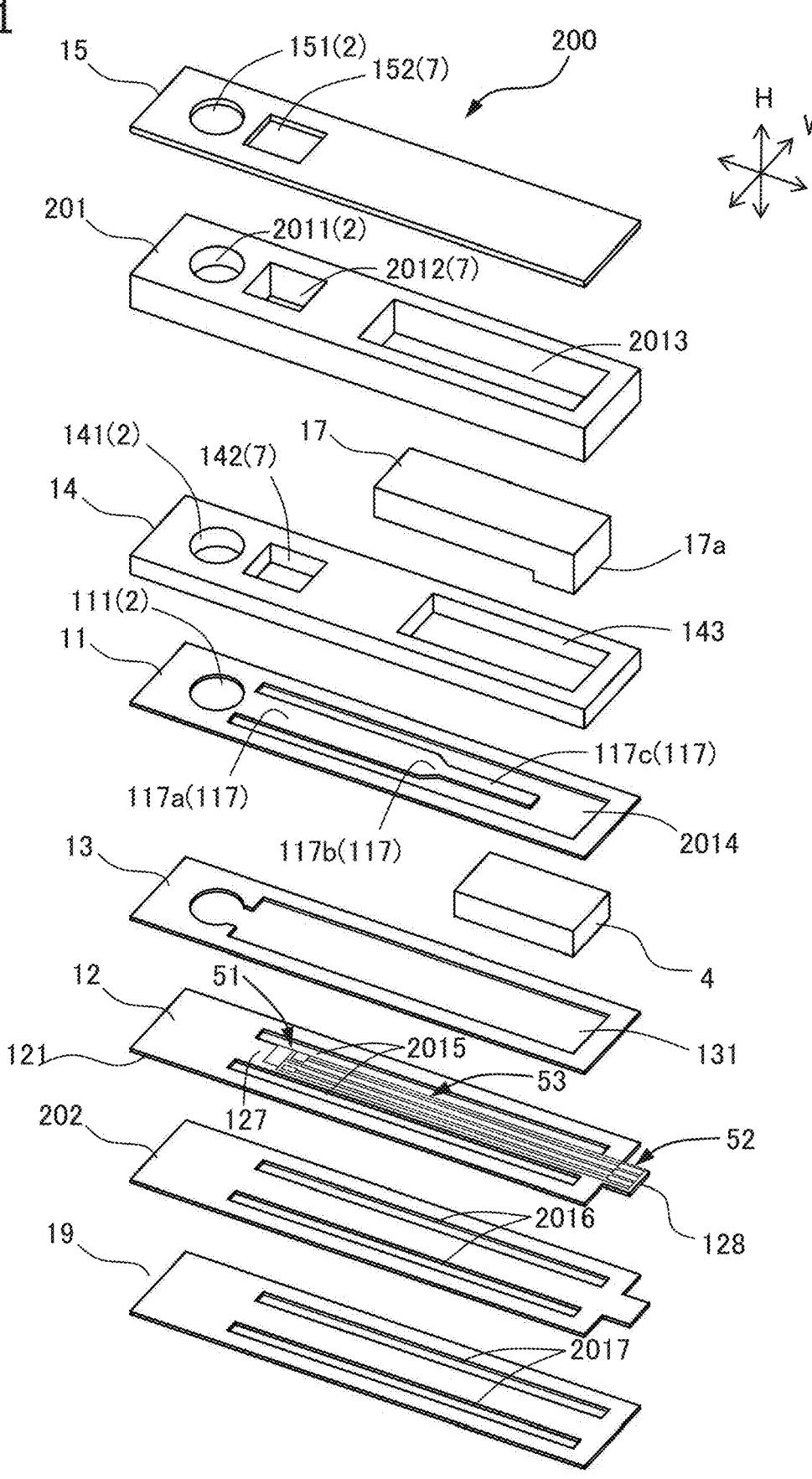
FIG. 21 is an exploded perspective view of the electrochemical assay device according to the fourth embodiment.

FIGS. 19 to 21 illustrate an assay device 200 according to a fourth embodiment. FIG. 19 is a perspective view of the assay device 200 according to the fourth embodiment, FIG. 20 is a sectional view of the assay device 200 according to the fourth embodiment, and FIG. 21 is an exploded perspective view of the assay device 200 according to the fourth embodiment. In FIGS. 19 to 21, the same reference signs are used for elements that are common to those of the assay device 1 according to the first embodiment. Hereinafter, configurations that are different from those of the assay device 1 according to the first embodiment will be mainly described.

Main differences between the assay device 1 according to the first embodiment and the assay device 200 according to the fourth embodiment are as follows. In the assay device 200 according to the fourth embodiment, the pair of second liquid absorbing materials 16 and 16 and the lower housing 18 are omitted from the assay device 1 according to the first embodiment, and a second upper housing 201 and a spacer member 202 are provided instead (see FIGS. 7 and 21). Also, an upper flow passage forming member 11, a lower flow passage forming member 12, a third liquid absorbing material 17, and a lower cover 19 in the assay device 200 according to the fourth embodiment have shapes that are different from those in the assay device 1 according to the first embodiment. Hereinafter, the second upper housing 201, the third liquid absorbing material 17, the upper flow passage forming member 11, the lower flow passage forming member 12, the spacer member 202, and the lower cover 19 will be described in this order.

The second upper housing 201 is disposed between an upper cover 15 and an upper housing 14. An outer shape of the second upper housing 201 in a top view is substantially the same as that of the upper housing 14. However, a dimension of the second upper housing 201 in the height direction H is larger than that of the upper housing 14. A fourth circular hole 2011 and a third window hole 2012 corresponding to a second circular hole 141 and a first window hole 142 of the upper housing 14 are formed in the second upper housing 201. The fourth circular hole 2011 and the third window hole 2012 penetrate through the second upper housing 201 in the height direction H. The fourth circular hole 2011 constitutes a part of an inlet 2, and the third window hole 2012 constitutes a part of an observation window 7.

In addition, a second accommodating hole 2013 is formed in the second upper housing 201. The second accommodating hole 2013 is provided at a position corresponding to an opening hole 143 of the upper housing 14 and penetrates through the second upper housing 201 in the height direction H. The second accommodating hole 2013 of the second upper housing 201 corresponds to the first accommodating hole 181 provided in the lower housing 18 of the assay device 1 according to the first embodiment in order to accommodate the third liquid absorbing material 17. The second upper housing 201 is configured with a molded article of a synthetic resin, for example, is attached to the upper surface of the upper housing 14, and is attached to a lower surface of the upper cover 15 using a double-sided adhesive sheet or the like, which is not illustrated.

In the assay device 200 according to the fourth embodiment, a third liquid absorbing material 17 includes a projecting portion 17a projecting downward on the other end in the longitudinal direction L. The third liquid absorbing material 17 is accommodated in the second accommodating hole 2013 of the second upper housing 201 in a state where the projecting portion 17*a* is in contact with (the upper surface of) the first liquid absorbing material 4. In other words, the third liquid absorbing material 17 is disposed above the first liquid absorbing material 4 in the assay device 200 according to the fourth embodiment.

In the assay device 200 according to the fourth embodiment, a first circular hole 111 and a second U-shaped hole 2014 with a laterally-facing substantially U shape in a top view are formed in the upper flow passage forming member 11. The second U-shaped hole 2014 is formed on the side closer to the other side of the upper flow passage forming member 11 in the longitudinal direction L than the first circular hole 111, and an opened part of the U shape faces the one side of the upper flow passage forming member 11 in the longitudinal direction L. The second U-shaped hole 2014 has a shape obtained by combining the pair of first slit holes 112 and 112 and the first U-shaped hole 113 of the upper flow passage forming member 11 in the assay device 1 according to the first embodiment. In other words, the second U-shaped hole 2014 penetrates through the upper flow passage forming member 11 in the height direction H. Also, an upper wall portion 117 constituting an upper wall of an inner flow passage 3 is formed by an inner part of the second U-shaped part 214 of the upper flow passage forming member 11 in the assay device 200 according to the fourth embodiment.

The upper wall portion 117 includes a first straight portion 117*a*, a narrowed width portion 117*b*, and a second straight portion 117*c* in this order from the one end in the longitudinal direction L, that is, from the side closer to the first circular hole 111 (inlet 2).

The first straight portion 117*a* linearly extends from the first circular hole 111 (inlet 2) toward the other end in the longitudinal direction L. A width of the first straight portion 117*a* is smaller than a diameter of the first circular hole 111 (inlet 2) and is constant. The narrowed width portion 117*b* means a part where a width of the upper wall portion 117 is narrowed. The narrowed width portion 117*b* is provided between the first straight portion 117*a* and the second straight portion 117*c* and establishes connection therebetween. In the embodiment, the narrowed width portion 117*b* is formed into a tapered shape with a width gradually narrowed from the width of the first straight portion 117*a* toward the other end in the longitudinal direction L. The second straight portion 117*c* linearly extends from the narrowed width portion 117*b* toward the other end in the longitudinal direction L. The width of the second straight portion 117*c* is smaller than the width of the first straight portion 117*a* and is constant. It is only necessary that the narrowed width portion 117*b* be a part where the width of the upper wall portion 117 is narrowed, and the narrowed width portion 117*b* is not limited to the tapered shape. For example, the narrowed width portion 117*b* may be formed into a stepped shape that changes from the width of the first straight portion 117*a* to the width of the second straight portion 117*c* in one stage or a plurality of stages.

In the assay device 200 according to the fourth embodiment, a pair of sixth slit holes 2015 and 2015 are formed in a main body portion 121 of the lower flow passage forming member 12. The pair of sixth slit holes 2015 and 2015 are formed to be located below the pair of linear parts of the second U-shaped hole 2014 of the upper flow passage forming member 11 when the upper flow passage forming member 11, the lower flow passage forming member 12, and the intermediate member 13 are stacked. Also, a lower wall portion 127 constituting the lower wall of the inner flow passage 3 is formed by a part sandwiched by the pair of sixth slit holes 2015 and 2015 in the lower flow passage forming member 12 in the assay device 200 according to the fourth embodiment. Moreover, an electrode portion 51 and a conducting wire portion 53 are formed on an upper surface of the part sandwiched between the pair of sixth slit holes 2015 and 2015, and a connecting portion 52 is formed on an upper surface of a projecting portion 128.

The spacer member 202 is disposed between the lower flow passage forming member 12 and the lower cover 19. An outer shape of the spacer member 202 in a top view is substantially the same as that of the main body portion 121 of the lower flow passage forming member 12. Also, a pair of seventh slit holes 2016 and 2016 corresponding to the pair of sixth slit holes 2015 and 2015 of the lower flow passage forming member 12 are formed in the spacer member 202. A dimension of the spacer member 202 in the height direction H may be set in an any optional manner. In other words, a dimension of the spacer member 202 in the height direction H may be the same as or different from that of the main body portion 121 of the lower flow passage forming member 12. The spacer member 202 is configured with a molded article of a synthetic resin, for example, and is attached to the lower surface of the lower flow passage forming member 12 using a double-sided adhesive sheet or the like, which is not illustrated. Note that in a case where the dimension of the spacer member 202 in the height direction H is the same as that of the main body portion 121 of the lower flow passage forming member 12, a component serving as the main body portion 121 of the lower flow passage forming member 12 may be used as the spacer member 202.

In the assay device 200 according to the fourth embodiment, a pair of slit grooves 2017 and 2017 corresponding to the pair of sixth slit holes 2015 and 2015 in the lower flow passage forming member 12 and the pair of seventh slit holes 2016 and 2016 in the spacer member 202 are formed in the lower cover 19. In the assay device 200 according to the fourth embodiment, the lower cover 19 is attached to the lower surface of the spacer member 202 using a double-sided adhesive sheet or the like, which is not illustrated. Note that the pair of slit grooves 2017 and 2017 may be a pair of slit holes.

In the assay device 200 according to the fourth embodiment, the upper wall of the microflow passage 31 is configured with the first straight portion 117*a* and the narrowed width portion 117*b* of the upper wall portion 117, and the upper wall of the separating flow passage 32 is configured with the second straight portion 117*c* of the upper wall portion 117. Also, the lower wall of the microflow passage 31 is configured with a part of the lower wall portion 127 corresponding to the first straight portion 117*a* and the narrowed width portion 117*b* of the upper wall portion 117, and the lower wall of the separating flow passage 32 is configured with a part of the lower wall portion 127 corresponding to the second straight portion 117*c* of the upper wall portion 117. Furthermore, a pair of first sideways spaces 5 and 5 and a pair of second sideways spaces 6 and 6 are formed by the pair of straight parts of the second U-shaped hole 2014 of the upper flow passage forming member 11, the pair of sixth slit holes 2015 and 2015 of the lower flow passage forming member 12, the pair of seventh slit holes 2016 and 2016 of the spacer member 202, and the pair of slit grooves 2017 and 2017 of the lower cover 19.

Configurations other than the configurations of the assay device 200 according to the fourth embodiment described above are basically the same as those of the assay device 1 according to the first embodiment.

Effects that are similar to those of the assay device 1 according to the first embodiment are obtained by the assay device 200 according to the fourth embodiment as well. Note that it is also possible to omit the spacer member 202 in the assay device 200 according to the fourth embodiment by appropriately adjusting the dimension of the lower flow passage forming member 12 in the height direction H and/or the dimension of the lower cover 19 in the height direction. Also, modifications that can be applied to the assay device 1 according to the first embodiment can also be applied to the assay device 200 according to the fourth embodiment. Furthermore, although not illustrated in the drawing, a plurality of assay devices 200 according to the fourth embodiment may be aligned in the width direction, integrated, and configured as a single assay device.

Fifth Embodiment

Figure 22:
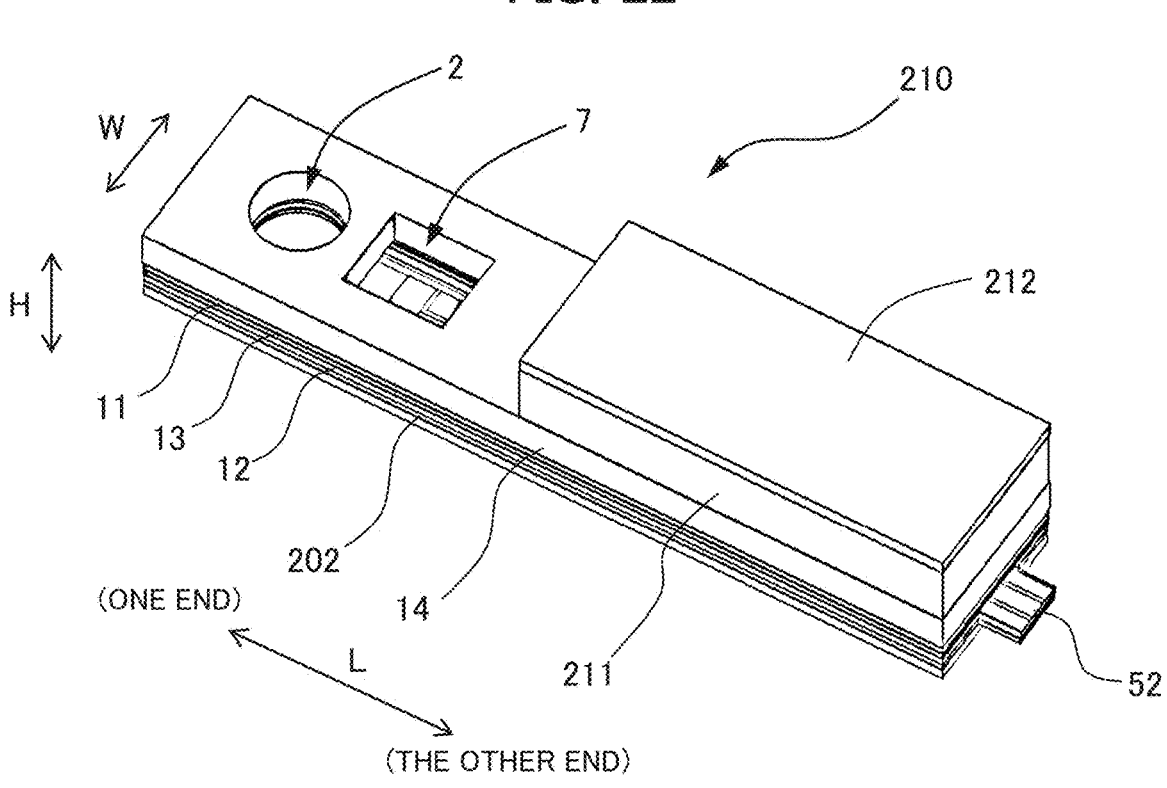
FIG. 22 is a perspective view of an electrochemical assay device according to a fifth embodiment.
Figure 23:
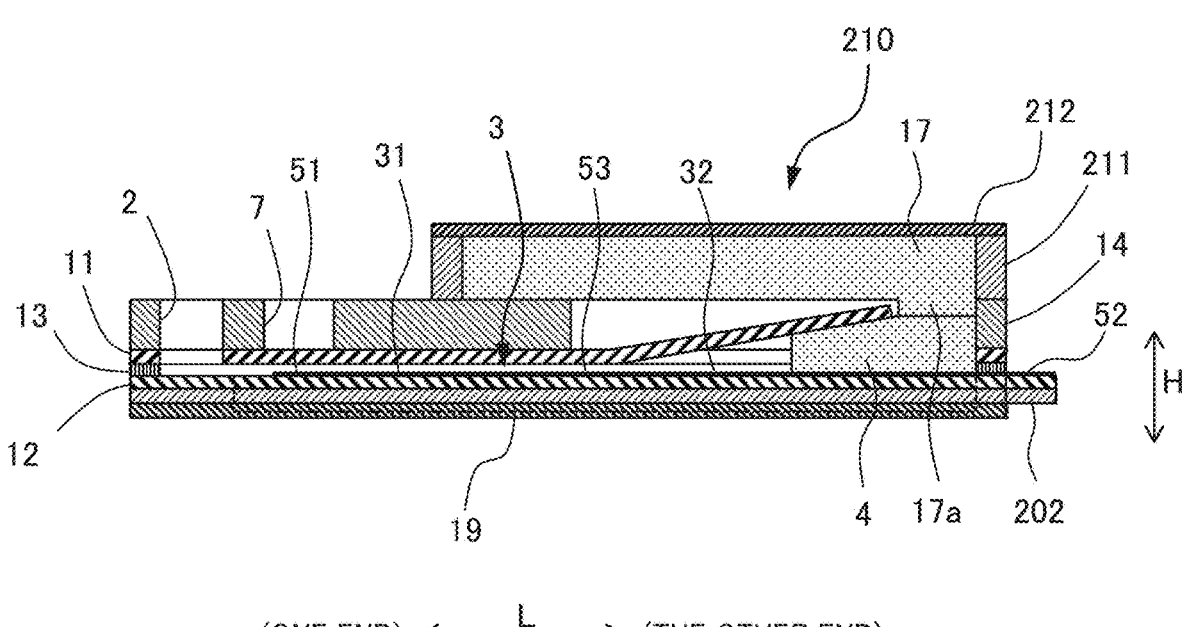
FIG. 23 is a schematic sectional view of the electrochemical assay device according to the fifth embodiment.
Figure 24:
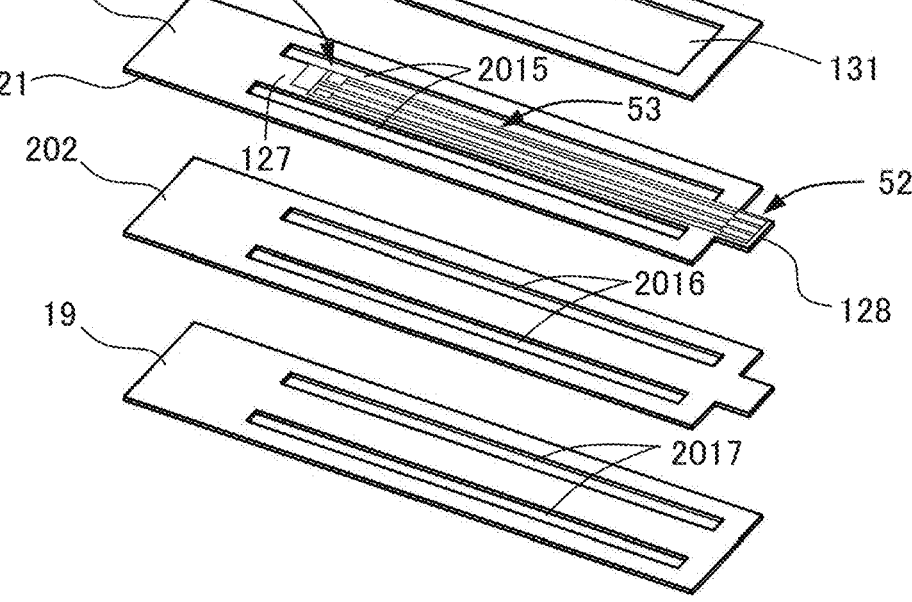
FIG. 24 is an exploded perspective view of the electrochemical assay device according to the fifth embodiment.

FIGS. 22 to 24 illustrate an assay device 210 according to a fifth embodiment. FIG. 22 is a perspective view of the assay device 210 according to the fifth embodiment, FIG. 23 is a sectional view of the assay device 210 according to the fifth embodiment, and FIG. 24 is an exploded perspective view of the assay device 210 according to the fifth embodiment. Hereinafter, configurations that are different from those of the assay device 200 according to the fourth embodiment will be mainly described.

A main difference between the assay device 200 according to the fourth embodiment and the assay device 210 according to the fifth embodiment is that an absorbing material housing 211 to accommodate a third liquid absorbing material 17 and a cover member 212 thereof are provided in the assay device 210 according to the fifth embodiment instead of the second upper housing 201 and the upper cover 15 in the assay device 200 according to the fourth embodiment (see FIGS. 21 and 24).

The absorbing material housing 211 is formed into a rectangular shape in a top view. Although a dimension of the absorbing material housing 211 in the longitudinal direction L is not particularly limited, the dimension may be about ½ the dimension of the upper housing 14. A dimension of the absorbing material housing 211 in the width direction is substantially the same as that of the upper housing 14, and a dimension of the absorbing material housing 211 in the height direction is larger than that of the upper housing 14. A third accommodating hole 2111 corresponding to the second accommodating hole 2013 of the second upper housing 201 in the assay device 200 according to the fourth embodiment is formed in the absorbing material housing 211. In other words, the third liquid absorbing material 17 is accommodated in the third accommodating hole 2111 of the absorbing material housing 211 in a state where a projecting portion 17a is in contact with (an upper surface of) a first liquid absorbing material 4 in the assay device 210 according to the fifth embodiment. The absorbing material housing 211 is configured with a molded article of a synthetic resin, for example, and is attached to the upper housing 14 such that the third accommodating hole 2111 is located above the opening hole 143 of the upper housing 14 using a double-sided adhesive sheet or the like, which is not illustrated.

The cover member 212 is configured with a molded article of a synthetic resin, for example. The cover member 212 is formed into a flat plate shape and has an outer shape that is substantially the same as an outer shape of the absorbing material housing 211 in a top view. The cover member 212 is attached to an upper surface of the absorbing material housing 211 to cover the third accommodating hole 2111 using a double-sided adhesive sheet or the like, which is not illustrated.

Configurations other than the configurations of the assay device 210 according to the fifth embodiment described above are basically the same as those of the assay device 200 according to the fourth embodiment.

Effects that are similar to those of the assay device 200 according to the fourth embodiment, and furthermore, effects that are similar to those of the assay device 1 according to the first embodiment are obtained by the assay device 210 according to the fifth embodiment as well. Note that modifications that can be applied to the assay device 1 according to the first embodiment and/or the assay device 200 according to the fourth embodiment can also be applied to the assay device 210 according to the fifth embodiment. Also, although not illustrated in the drawing, a plurality of assay devices 210 according to the fifth embodiment may be aligned in a width direction, integrated, and configured as a single assay device.

Although the embodiments and modifications of the present invention have been described hitherto, it is a matter of course that the present invention is not limited to the aforementioned embodiments and modifications and changes can be made based on the technical concept of the present invention.

EXAMPLES

Example 1

In Example 1, a potentiostat was connected to the assay device according to the embodiment, and measurement was conducted for a $K_3[Fe(CN)_6]$(potassium ferricyanide) solution by a cyclic voltammetry method. When the $K_3[Fe(CN)_6]$ solution was dropped into the inlet 2, a current value with an oxidation-reduction reaction was observed. When a medium that did not contain the $K_3[Fe(CN)_6]$ solution was then dropped into the inlet 2 instead of the $K_3[Fe(CN)_6]$ solution, a characteristic peak current of the $K_3[Fe(CN)_6]$ solution was not observed. On the basis of these facts, it was confirmed that the assay device according to the embodiment was able to perform an assay based on the cyclic voltammetry method and was able to perform replacement and stationary leaving of the liquid inside the assay device.

Example 2

In Example 2, the assay device according to the embodiment was incorporated in an electrochemiluminescence measurement device, and measurement of electrochemiluminescence of a luminol based on the cyclic voltammetry method was conducted. The luminol was oxidized on the surface of the electrode and was turned into radical or diazoquinone at about 0.2 to 0.3 V, and the oxidized luminol (the radial or the diazoquinone) reacts (oxidation) with reactive oxygen species (such as $H_2O_2$ and $O_2$—) generated through an electrochemical reduction reaction from dissolved oxygen by applying a negative charge (−0.5 to −1.0 V) and emits light. Here, antioxidant levels (antioxidant effects) of an apple juice, an orange juice, a grape juice, and a tomato juice were measured using the fact that the reactive oxygen species competitively react between the luminol and the antioxidant substances. It was confirmed that the antioxidant levels of all the juices were able to be measured.

Example 3

In Example 3, the assay device according to the embodiment was incorporated in an electrochemiluminescence measurement device, and measurement of electrochemiluminescence of a luminol using gold nanoparticles was conducted. Specifically, 10 mM of luminol solution was adjusted to a 0.2 mM of luminol solution with a tris hydrochloride acid buffer (pH 8, 200 mM), a gold nanoparticle solution and a tris hydrochloride acid buffer (pH 8, 200 mM) were mixed at 1:4, and a resultant obtained by mixing them at 1:1 was used in Example 3. As a result, it was confirmed that measurement of the electrochemiluminescence of the luminol was able to be conducted with no problems. Note that since the gold nanoparticles in the tris hydrochloride acid buffer reacted with the dissolved oxygen and generates reactive oxygen species in this case, it was not necessary to generate the reactive oxygen species through an electrochemical reaction unlike Example 2.

REFERENCE SIGNS LIST 1, 1', 10, 10', 100, 100', 200, 210 Assay device
2 Inlet
3 Inner flow passage
4 First liquid absorbing material
11 Upper flow passage forming member
12 Lower flow passage forming member
13 Intermediate member
31 Microflow passage
32 Separating flow passage
51 Electrode portion
52 Connecting portion
53 Conducting wire portion
54 Electrical insulating material
117 Upper wall portion
127, 227 Lower wall portion
LQ1 First liquid
LQ2 Second liquid

The invention claimed is:

1. An electrochemical assay device comprising: an inner flow passage through which a liquid injected from an inlet flows; and a liquid absorbing material that absorbs the liquid that has passed through the inner flow passage, and configured to be able to perform an assay based on an electrochemical method, wherein the inner flow passage includes a microflow passage that communicates with the inlet and a separating flow passage that is provided between the microflow passage and the liquid absorbing material for separating the liquid inside the inner flow passage into a part to be left in the microflow passage and a part to be absorbed by the liquid absorbing material when the injection of the liquid is stopped, and wherein the inner flow passage is formed by an upper flow passage forming member including an upper wall portion constituting an upper wall of the inner flow passage, a lower flow passage forming member including a lower wall portion constituting a lower wall of the inner flow passage, and an intermediate member functioning as a spacer between the upper flow passage forming member and the lower flow passage forming member being stacked, the electrochemical assay device further comprising: an electrode portion, a connecting portion connected to an external measurement device; and a conducting wire portion electrically connecting the electrode portion to the connecting portion that are all formed on the lower flow passage forming member or on the upper flow passage forming member, when the electrode portion, the connecting portion, and the conducting wire portion are formed on the lower flow passage forming member, the upper flow passage forming member is transparent, and the lower flow passage forming member has a white color or a black color, and when the electrode portion, the connecting portion, and the conducting wire portion are formed on the upper flow passage forming member, the lower flow passage forming member is transparent, and the upper flow passage forming member has a white color or a black color.

2. The electrochemical assay device according to claim 1, wherein the electrode portion, the connecting portion, and the conducting wire portion are formed by a conductive material printed on the upper flow passage forming member or on the lower flow passage forming member.

3. The electrochemical assay device according to claim 1, wherein the connecting portion is provided on a side opposite to the electrode portion with the liquid absorbing material sandwiched therebetween in a flow direction of the liquid and projects outward.

4. The electrochemical assay device according to claim 3, wherein the conducting wire portion extends inside the inner flow passage.

5. The electrochemical assay device according to claim 3, wherein the conducting wire portion extends in parallel with a flow direction of the liquid.

6. The electrochemical assay device according to claim 1, wherein the connecting portion is provided on a side opposite to the electrode portion with the inlet sandwiched therebetween in a flow direction of the liquid and projects outward.

7. The electrochemical assay device according to claim 1, wherein the connecting portion is provided to be separated from the electrode portion in a width direction perpendicularly intersecting a flow direction of the liquid and projects outward.

8. The electrochemical assay device according to claim 7, wherein the conducting wire portion extends in parallel with the width direction perpendicularly intersecting the flow direction of the liquid.

9. The electrochemical assay device according to claim 1, comprising an observation window for observing a vicinity of the electrode portion from an outside, wherein when the electrode portion, the connecting portion, and the conducting wire portion are formed on the lower flow passage forming member, the observation window is formed on an upper surface of the electrochemical assay device, and when the electrode portion, the connecting portion, and the conducting wire portion are formed on the upper flow passage forming member, the observation window is formed on a lower surface of the electrochemical assay device.

10. The electrochemical assay device according to claim 1, wherein the lower flow passage forming member comprises a projecting portion that projects outward from an end portion on a downstream side of the electrochemical assay device in a flow direction of the liquid, the projecting portion being formed into a rectangular shape in a top view, having a width that is substantially the same as a width of the lower wall portion, and located on an extension of the lower wall portion, and the electrode portion is formed on a part of the lower wall portion of the lower flow passage forming member, the part constituting a lower wall of the microflow passage, the connecting portion is formed on the projecting portion of the lower flow passage forming member, and the conducting wire portion is formed on the lower wall portion of the lower flow passage forming member to connect the electrode portion to the connecting portion, and a part of the upper wall portion of the upper flow passage forming member, the part constituting an upper wall of the separating flow passage, is inclined upward so as to be higher as the part goes away from the microflow passage.

11. The electrochemical assay device according to claim 1, wherein a pair of first sideways spaces is provided on both sides of the microflow passage to communicate with the microflow passage, a pair of second sideways spaces is provided on both sides of the separating flow passage to communicate with the separating flow passage, and the pair of first sideways spaces and the pair of second sideways spaces penetrate through the upper flow passage forming member and the lower flow passage forming member in a height direction.

12. An electrochemical assay device comprising: an inner flow passage through which a liquid injected from an inlet flows; and a liquid absorbing material that absorbs the liquid that has passed through the inner flow passage, and configured to be able to perform an assay based on an electrochemical method, wherein the inner flow passage includes a microflow passage that communicates with the inlet and a separating flow passage that is provided between the microflow passage and the liquid absorbing material for separating the liquid inside the inner flow passage into a part to be left in the microflow passage and a part to be absorbed by the liquid absorbing material when the injection of the liquid is stopped, and wherein the inner flow passage is formed by an upper flow passage forming member including an upper wall portion constituting an upper wall of the inner flow passage, a lower flow passage forming member including a lower wall portion constituting a lower wall of the inner flow passage, and an intermediate member functioning as a spacer between the upper flow passage forming member and the lower flow passage forming member being stacked, the electrochemical assay device further comprising: a plurality of electrode portions separated from each other in a flow direction of the liquid; a plurality of connecting portions each provided to be separated from any of the plurality of electrode portions in a width direction perpendicularly intersecting the flow direction of the liquid and connected to an external measurement device; and a plurality of conducting wire portions electrically connecting the corresponding electrode portions to the connecting portions, respectively, that are all formed on the lower flow passage forming member or on the upper flow passage forming member, when the plurality of electrode portions, the plurality of connecting portions, and the plurality of conducting wire portions are formed on the lower flow passage forming member, the upper flow passage forming member is transparent, and the lower flow passage forming member has a white color or a black color, and when the plurality of electrode portions, the plurality of connecting portions, and the plurality of conducting wire portions are formed on the upper flow passage forming member, the lower flow passage forming member is transparent, and the upper flow passage forming member has a white color or a black color.

13. The electrochemical assay device according to claim 12, comprising an observation window for observing a vicinity of the electrode portion from an outside, wherein when the plurality of electrode portions, the plurality of connecting portions, and the plurality of conducting wire portions are formed on the lower flow passage forming member, the observation window is formed on an upper surface of the electrochemical assay device, and when the plurality of electrode portions, the plurality of connecting portions, and the plurality of conducting wire portions are formed on the upper flow passage forming member, the observation window is formed on a lower surface of the electrochemical assay device.

14. The electrochemical assay device according to claim 12, wherein the lower flow passage forming member comprises a plurality of projecting portions each projecting outward from an end portion in a width direction perpendicularly intersecting a flow direction of the liquid, the plurality of projecting portions each formed into a rectangular shape in a top view and provided to be separated from each other in the flow direction of the liquid, the plurality of electrode portions is formed on a part of the lower wall portion of the lower flow passage forming member, the part constituting a lower wall of the microflow passage, the plurality of connecting portions is formed on the plurality of projecting portions of the lower flow passage forming member, and the plurality of the conducting wire portions is formed on the lower wall portion of the lower flow passage forming member to connect the corresponding electrode portions to the connecting portions, respectively, and a part of the upper wall portion of the upper flow passage forming member, the part constituting an upper wall of the separating flow passage, is inclined upward so as to be higher as the part goes away from the microflow passage.

15. The electrochemical assay device according to claim 12, wherein a pair of first sideways spaces is provided on both sides of the microflow passage to communicate with the microflow passage, a pair of second sideways spaces is provided on both sides of the separating flow passage to communicate with the separating flow passage, and the pair of first sideways spaces and the pair of second sideways spaces penetrate through the upper flow passage forming member and the lower flow passage forming member in a height direction.

* * * * *